under 35 U.S.C. 154(b) by 0 days.

(12) United States Patent
Roimela et al.

(10) Patent No.: US 11,240,532 B2
(45) Date of Patent: Feb. 1, 2022

(54) EFFICIENT CULLING OF VOLUMETRIC VIDEO ATLAS BITSTREAMS

(71) Applicant: Nokia Technologies Oy, Espoo (FI)

(72) Inventors: Kimmo Tapio Roimela, Tampere (FI); Lauri Ilola, Tampere (FI); Vinod Kumar Malamal Vadakital, Tampere (FI); Lukasz Kondrad, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/188,295

(22) Filed: Mar. 1, 2021

(65) Prior Publication Data

US 2021/0281879 A1 Sep. 9, 2021

Related U.S. Application Data

(60) Provisional application No. 62/984,410, filed on Mar. 3, 2020.

(51) Int. Cl.
*H04N 19/597* (2014.01)
*G06T 15/08* (2011.01)
*H04N 13/194* (2018.01)
*H04N 13/161* (2018.01)

(52) U.S. Cl.
CPC ........... *H04N 19/597* (2014.11); *G06T 15/08* (2013.01); *H04N 13/161* (2018.05); *H04N 13/194* (2018.05)

(58) Field of Classification Search
None
See application file for complete search history.

(56) References Cited

FOREIGN PATENT DOCUMENTS

WO WO-2019/202207 A1 10/2019
WO WO2021067503 * 4/2021

OTHER PUBLICATIONS

Wang, Chuchu, et al., "Culling of subblocks for viewport rendering in immersive video", ISO/IEC JTC1/SC29/WG11 MPEG2019/m, Jan. 2020, 8 pages.
Oh, Sejin, "[PCC-SYSTEM] Mapping between 3D spatial regions of point cloud data and subset of V-PCC components for partial access of point cloud data", ISO/IEC JTC1/SC29/WG11 MPEG2019/m52286, Jan. 2020, 4 pages.

(Continued)

*Primary Examiner* — Christopher Braniff
(74) *Attorney, Agent, or Firm* — Harrington & Smith

(57) ABSTRACT

An apparatus includes circuitry configured to: receive information to cull one or more sets of components belonging to the same atlas from at least one volumetric video bitstream; wherein the information comprises one or more of: atlas-to-view mapping metadata indicating an association between patches in at least one atlas and at least one view; atlas-to-object mapping metadata indicating an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and cull the one or more sets of components from the at least one volumetric video bitstream, based on the information.

20 Claims, 16 Drawing Sheets

(56) References Cited

OTHER PUBLICATIONS

Tourapis, A.M., et al., "{V-PCC} Object Annotation of Patches and Volumetric Rectangles in V-PCC", ISO/IEC JTC1/SC29/WG11 MPEG2019/m52705, Jan. 2020, 14 pages.
U.S. Appl. No. 17/140,580, filed Jan. 4, 2021.

\* cited by examiner

FIG.1B

| | |
|---|---|
| miv_view_params_list( ) { | Descriptor |
|   mvp_num_views_minus1 | u(16) |
|   for( v = 0; v <= num_views_minus1; v++ ) { | |
|     camera_extrinsics( v ) | |
|     mvp_atlas_map_flag | u(1) |
|     if(mvp_atlas_map_flag) | |
|       mvp_atlas_map_mask | u(v) |
|   } | |
|   mvp_intrinsic_params_equal_flag | u(1) |
|   for( v = 0; v <= mvp_intrinsic_params_equal_flag ? 0 : mvp_num_views_minus1; v++ ) | |
|     camera_intrinsics( v ) | |
|   mvp_depth_quantization_params_equal_flag | u(1) |
|   for( v = 0; v <= mvp_depth_quantization_equal_flag ? 0 : mvp_num_views_minus1; v++ ) | |
|     depth_quantization( v ) | |
|   mvp_pruning_graph_params_present_flag | u(1) |
|   if ( mvp_pruning_graph_params_present_flag ) | |
|     for( v = 0; v <= mvp_num_views_minus1; v++ ) | |
|       pruning_children( v ) | |
| } | |

| miv_view_params_update_extrinsics( ) { | Descriptor |
|---|---|
|   mvpue_num_view_updates_minus1 | u(16) |
|   for( i = 0; i <= mvpue_num_views_updates_minus1; i++ ) { | |
|     mvpue_view_idx[ i ] | u(16) |
|     camera_extrinsics( mvpue_view_idx[ i ] ) | |
|     mvpue_atlas_map_flag | u(1) |
|     if(mvpue_atlas_map_flag) | |
|       mvpue_atlas_map_mask | u(v) |
|   } | |
| } | |

| adaptation_params_rbsp( ) { | Descriptor |
|---|---|
|   ap_id | ue(v) |
|   ap_camera_params_present_flag | u(1) |
|   if( ap_camera_params_present_flag ) | |
|     camera_params( ) | |
|   ap_extension_bit_equal_to_one | f(1) |
|   ap_miv_view_params_list_present_flag | u(1) |
|   if( ap_miv_view_params_list_present_flag ) { | |
|     ap_miv_view_params_list_update_mode | u(2) |
|     if( ap_miv_view_params_list_present_mode == VPL_INITLIST ) | |
|       miv_view_params_list( ) | |
|     else if( ap_miv_view_params_list_present_mode == VPL_UPD_EXT ) | |
|       miv_view_params_update_extrinsics( ) | |
|     else if( ap_miv_view_params_list_present_mode == VPL_UPD_INT ) | |
|       miv_view_params_update_intrinsics( ) | |
|     else if( ap_miv_view_params_list_present_mode == VPL_EXT_INT ) { | |
|       miv_view_params_update_extrinsics( ) | |
|       miv_view_params_update_intrinsics( ) | |
|     } | |
|   } | |
|   miv_atlas_map_update_flag | u(1) |
|   if(miv_atlas_map_update_flag) | |
|     miv_atlas_map_update( ) | |
|   ap_extension2_flag | u(1) |
|   if( ap_extension2_flag ) { | |
|     while ( more_rbsp_data() ) | |
|       ap_extension_data_flag | u(1) |
|   rbsp_trailing_bits( ) | |
| } | |

| miv_atlas_map_update( ){ | Descriptor |
|---|---|
|   mvpue_num_view_updates_minus1 | u(16) |
|   for( i = 0; i <= mamue_num_views_updates_minus1; i++ ) { | |
|     mvpue_view_idx[ i ] | u(16) |
|     mvpue_atlas_map_mask | u(v) |
|   } | |
| } | |

700

| patch_information ( payload_size ) { | Descriptor |
|---|---|
| pi_cancel_flag | u(1) |
| pi_num_tile_group_updates | ue(v) |
| if ( pi_num_tile_group_updates > 0 ) { | ue(v) |
| pi_log2_max_object_idx_tracked | u(5) |
| pi_log2_max_patch_idx_updated | u(4) |
| } | |
| for( i = 0; i <= pi_num_tile_group_updates; i++ ) { | |
| pi_tile_group_address[ i ] | ue(v) |
| j = pi_tile_group_address[ i ] | |
| pi_tile_group_cancel_flag[ j ] | u(1) |
| pi_num_patch_updates[ j ] | ue(v) |
| for( k = 0; k < pi_num_patch_updates[ j ]; k++ ) { | |
| pi_patch_idx[ j ][ k ] | u(v) |
| p = pi_patch_idx[ j ][ k ] | |
| pi_patch_cancel_flag[ j ][ p ] | u(1) |
| if( !pi_patch_cancel_flag[ j ][ p ] ) { | |
| pi_patch_number_of_objects_minus1[ j ][ p ] | ue(v) |
| m = pi_patch_number_of_objects_minus1[ j ][ p ] + 1 | |
| for (n = 0; n < m; n++) | |
| pi_patch_object_idx[ j ][ p ][ n ] | u(v) |
| pi_patch_atlas_map_mask | u(v) |
| } | |
| } | |
| } | |
| } | |

| scene_object_information( payloadSize ) { | Descriptor |
|---|---|
| soi_cancel_flag | u(1) |
| soi_num_object_updates | ue(v) |
| if ( soi_num_object_updates > 0 ) { | |
| soi_simple_objects_flag | u(1) |
| if ( soi_simple_objects_flag == 0 ) { | |
| soi_object_label_present_flag | u(1) |
| soi_priority_present_flag | u(1) |
| soi_object_hidden_present_flag | u(1) |
| soi_object_dependency_present_flag | u(1) |
| soi_visibility_cones_present_flag | u(1) |
| soi_3d_bounding_box_present_flag | u(1) |
| soi_collision_shape_present_flag | u(1) |
| soi_point_style_present_flag | u(1) |
| soi_material_id_present_flag | u(1) |
| soi_extension_present_flag | u(1) |
| } | |
| else { | |
| soi_object_label_present_flag = 0 | |
| soi_priority_present_flag = 0 | |
| soi_object_hidden_present_flag = 0 | |
| soi_object_dependency_present_flag = 0 | |
| soi_visibility_cones_present_flag = 0 | |
| soi_3d_bounding_box_present_flag = 0 | |
| soi_collision_shape_present_flag = 0 | |
| soi_point_style_present_flag = 0 | |
| soi_material_id_present_flag = 0 | |
| soi_extension_present_flag = 0 | |
| } | |
| if (soi_3d_bounding_box_present_flag) { | |
| soi_3d_bounding_box_scale_log2 | u(5) |
| soi_3d_bounding_box_precision_minus8 | u(5) |
| } | |
| soi_log2_max_object_idx_updated | u(5) |

FIG. 8A

| FIG. 8A |
| FIG. 8B |
| FIG. 8C |

| | |
|---|---|
| if( soi_object_dependency_present_flag ) | |
|     soi_log2_max_object_dependency_idx | u(5) |
| for( i = 0; i <= soi_num_object_updates; i++ ) { | |
|     soi_object_idx[ i ] | u(v) |
|     soi_object_atlas_map_mask | u(v) |
|     k = soi_object_idx[ i ] | |
|     soi_object_cancel_flag[ k ] | u(1) |
|     ObjectTracked[ k ] = ! pi_object_cancel_flag[ k ] ] | |
|     if (!soi_object_cancel_flag[ k ]) { | |
|         if( soi_object_label_present_flag) { | |
|             soi_object_label_update_flag[ k ] | u(1) |
|             if( soi_object_label_update_flag[ k ] ) | |
|             soi_object_label_idx[ k ] | ue(v) |
|         } | |
|         if( soi_priority_present_flag ) { | |
|             soi_priority_update_flag[ k ] | u(1) |
|             if( soi_priority_update_flag[ k ] ) | |
|             soi_priority_value[ k ] | u(4) |
|         } | |
|         if( soi_object_hidden_present_flag ) | |
|             soi_object_hidden_flag[ k ] | u(1) |
|         if( soi_object_dependency_present_flag ) { | |
|             soi_object_dependency_update_flag[ k ] | u(1) |
|             if (soi_object_dependency_update_flag[ k ]) { | |
|                 soi_object_num_dependencies[ k ] | u(4) |
|                 for( j = 0; j <    soi_object_num_dependencies[ k ]; j++ ) | |
|                     soi_object_dependency_idx[ k ][ j ] | u(v) |
|             } | |
|         } | |
|         if( soi_visibility_cones_present_flag ) { | |
|             soi_visibility_cones _update_flag[ k ] | u(1) |
|             if( soi_visibility_cones_update_flag[ k ]) { | |
|                 soi_direction_x[ k ] | u(32) |
|                 soi_direction_y[ k ] | u(32) |

| | |
|---|---|
| soi_direction_z[ k ] | u(32) |
| soi_angle[ k ] | u(16) |
| } | |
| } | |
| if( soi_3d_bounding_box_present_flag ) { | |
| soi_3d_bounding_box_update_flag[ k ] | u(1) |
| if( soi_3d_bounding_box_update_flag[ k ]) { | |
| soi_3d_bounding_box_x[ k ] | u(v) |
| soi_3d_bounding_box_y[ k ] | u(v) |
| soi_3d_bounding_box_z[ k ] | u(v) |
| soi_3d_bounding_box_delta_x[ k ] | u(v) |
| soi_3d_bounding_box_delta_y[ k ] | u(v) |
| soi_3d_bounding_box_delta_z[ k ] | u(v) |
| } | |
| } | |
| if( soi_collision_shape_present_flag ) { | |
| soi_collision_shape_update_flag[ k ] | u(1) |
| if (soi_collision_shape_update_flag[ k ] ) | |
| soi_collision_shape_id[ k ] | u(16) |
| } | |
| if( soi_point_style_present_flag ) { | |
| soi_point_style_update_flag[ k ] | u(1) |
| if (soi_point_style_update_flag[ k ] ) | |
| soi_point_shape_id[ k ] | u(8) |
| soi_point_size[ k ] | u(16) |
| } | |
| if( soi_material_id_present_flag ) { | |
| soi_material_id_update_flag[ k ] | u(1) |
| if (soi_material_id_update_flag[ k ] ) | |
| soi_material_id[ k ] | u(16) |
| } | |
| } | |
| } | |
| } | |
| } | |

EFFICIENT CULLING OF VOLUMETRIC VIDEO ATLAS BITSTREAMS

RELATED APPLICATION

This application claims priority to U.S. Provisional Application No. 62/984,410, filed Mar. 3, 2020, which is hereby incorporated by reference in its entirety.

TECHNICAL FIELD

The examples and non-limiting embodiments relate generally to video codecs, and more particularly, to efficient culling of volumetric video atlas bitstreams.

BACKGROUND

It is known to perform video coding and decoding.

SUMMARY

In accordance with an aspect, an apparatus includes at least one processor; and at least one non-transitory memory including computer program code; wherein the at least one memory and the computer program code are configured to, with the at least one processor, cause the apparatus at least to: receive information to cull one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and cull the one or more sets of components belonging to the same atlas from the at least one volumetric video bitstream, based on the information.

In accordance with an aspect, an apparatus includes at least one processor; and at least one non-transitory memory including computer program code; wherein the at least one memory and the computer program code are configured to, with the at least one processor, cause the apparatus at least to: provide information related to a culling of one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and transmit the information to a receiving device.

In accordance with an aspect, a method includes receiving information to cull one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and culling the one or more sets of components belonging to the same atlas from the at least one volumetric video bitstream, based on the information.

In accordance with an aspect, a method includes providing information related to a culling of one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and transmitting the information to a receiving device.

In accordance with an aspect, a non-transitory program storage device readable by a machine, tangibly embodying a program of instructions executable by the machine for performing operations is provided, the operations comprising: receiving information to cull one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and culling the one or more sets of components belonging to the same atlas from the at least one volumetric video bitstream, based on the information.

In accordance with an aspect, a non-transitory program storage device readable by a machine, tangibly embodying a program of instructions executable by the machine for performing operations is provided, the operations comprising: providing information related to a culling of one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and transmitting the information to a receiving device.

BRIEF DESCRIPTION OF THE DRAWINGS

The foregoing aspects and other features are explained in the following description, taken in connection with the accompanying drawings, wherein:

FIG. 1A, FIG. 1B, and FIG. 1C (collectively FIG. 1) depict a 3VC elementary stream structure for one atlas (patch data and video encoded components).

FIG. 3 shows an example modified miv_view_params_list( ) sub-structure of the adaptation_params_rbsp( ) structure in 3VC (as specified in WD4 d24 of ISO/IEC 23090-12), with the modification highlighted.

FIG. 4 shows an example modified miv_view_params_update_extrinsics( ) sub-structure of the adaptation_params_rbsp( ) structure in 3VC (as specified in WD4 d24 of ISO/IEC 23090-12), with the modification highlighted.

FIG. 5 shows an example modified adaptation_params_rbsp( ) structure in 3VC (as specified in WD4 d24 of ISO/IEC 23090-12), with the modification highlighted which includes a new structure miv atlas map update( ).

FIG. 7 shows an example modified patch information SEI message, with the modification highlighted.

FIG. 8A shows a first part of an example modified scene object information SEI message, and wherein collectively FIG. 8A, FIG. 8B, and FIG. 8C are FIG. 8.

FIG. 8B shows a second part of the example modified scene object information SEI message, with the modification highlighted.

FIG. 8C shows a third part of the example modified scene object information SEI message.

DETAILED DESCRIPTION OF EXAMPLE EMBODIMENTS

Figures 1, 1A:
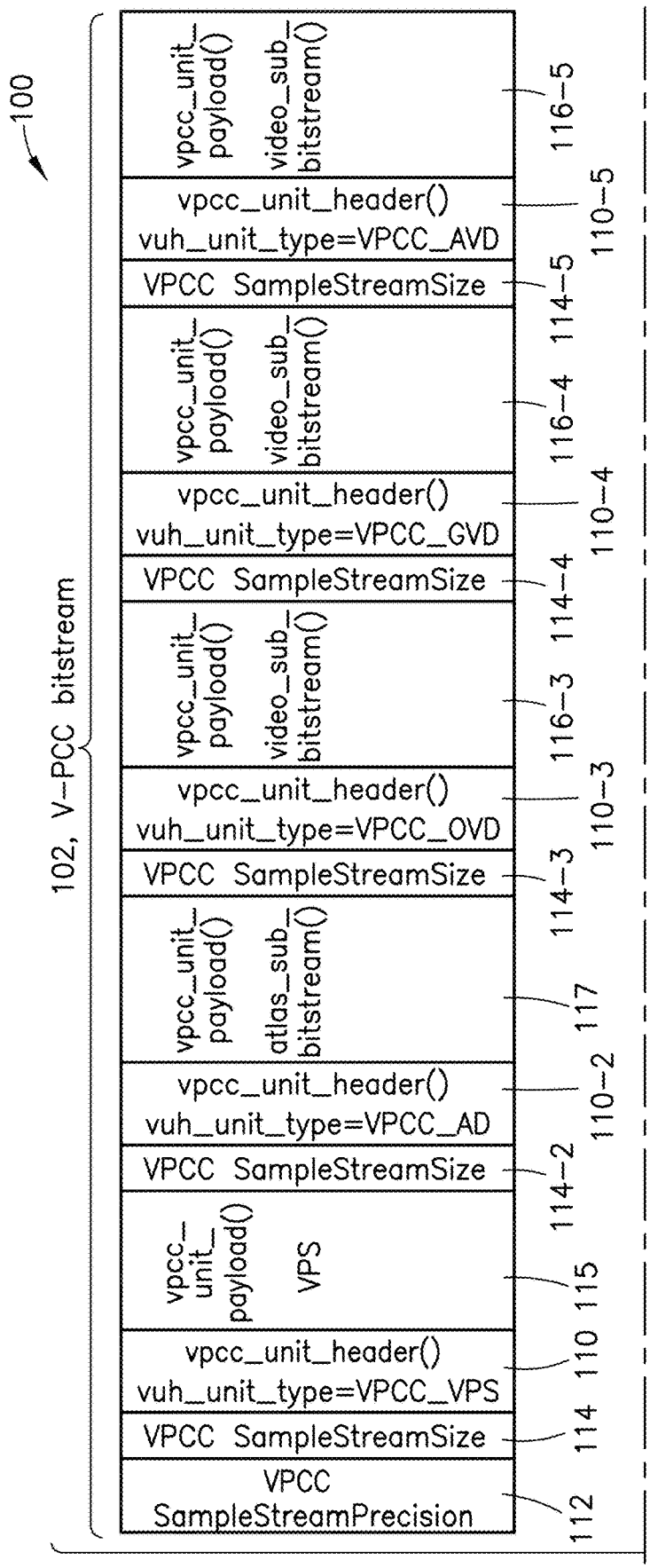

The following acronyms and abbreviations that may be found in the specification and/or the drawing figures are defined as follows:
2D two-dimensional
3D or 3d three-dimensional
3GPP 3rd Generation Partnership Project
3VC video-based volumetric video coding standard, or volumetric video coding
ACL atlas coding layer
AFPS atlas frame parameter set
ASIC application specific integrated circuit
ASPS atlas sequence parameter set
ATGDU atlas tile group data unit
CD committee draft
CPCS coded point cloud sequence
CTU coding tree unit
DIS draft international standard
EOB end of bitstream
EOS end of sequence
Exp exponential
FDIS final draft international standard
f(n) fixed-pattern bit string using n bits written (from left to right) with the left bit first
FPGA field programmable gate array
GOP group of picture(s)
HEVC high efficiency video coding
HMD head mounted display
ID or id identifier
IEC International Electrotechnical Commission
info information
I/O input/output
IRAP intra random access picture
ISO International Organization for Standardization
ISOBMFF ISO/IEC base media file format
MIV MPEG Immersive Video standard, or Metadata for Immersive Video
MP4 MPEG-4 Part 14
MPEG moving picture experts group
NAL network abstraction layer
NW network
params parameters
RBSP or rbsp raw byte sequence payload
SEI supplemental enhancement information
u(n) unsigned integer using n bits
u(v) unsigned integer where the number of bits varies in a manner dependent on the value of other syntax elements
UE user equipment
ue(v) unsigned integer 0-th order Exp-Golomb-coded syntax element with the left bit first
V3C visual volumetric video-based coding
VPCC or V-PCC video based point cloud coding standard or video-based point cloud compression
VPS V-PCC parameter set
WD4 working draft 4

The examples referred to herein relate to volumetric video coding, where dynamic 3D objects or scenes are coded into video streams for delivery and playback. The MPEG standards V-PCC (Video-based Point Cloud Compression) and MIV (Metadata for Immersive Video) are two examples of such volumetric video compression. These standards share a common base standard, 3VC (Volumetric Video Coding).

In both V-PCC and MIV, a similar methodology is adopted: the 3D scene is segmented into a number of regions according to heuristics based on, for example, spatial proximity and/or similarity of the data in the region. The segmented regions are projected into 2D patches, where each patch contains at least surface texture and depth channels, the depth channel giving the displacement of the surface pixels from the 2D view plane associated with that patch. The patches are further packed into an atlas that can be encoded and streamed as a regular 2D video.

Figure 1B:
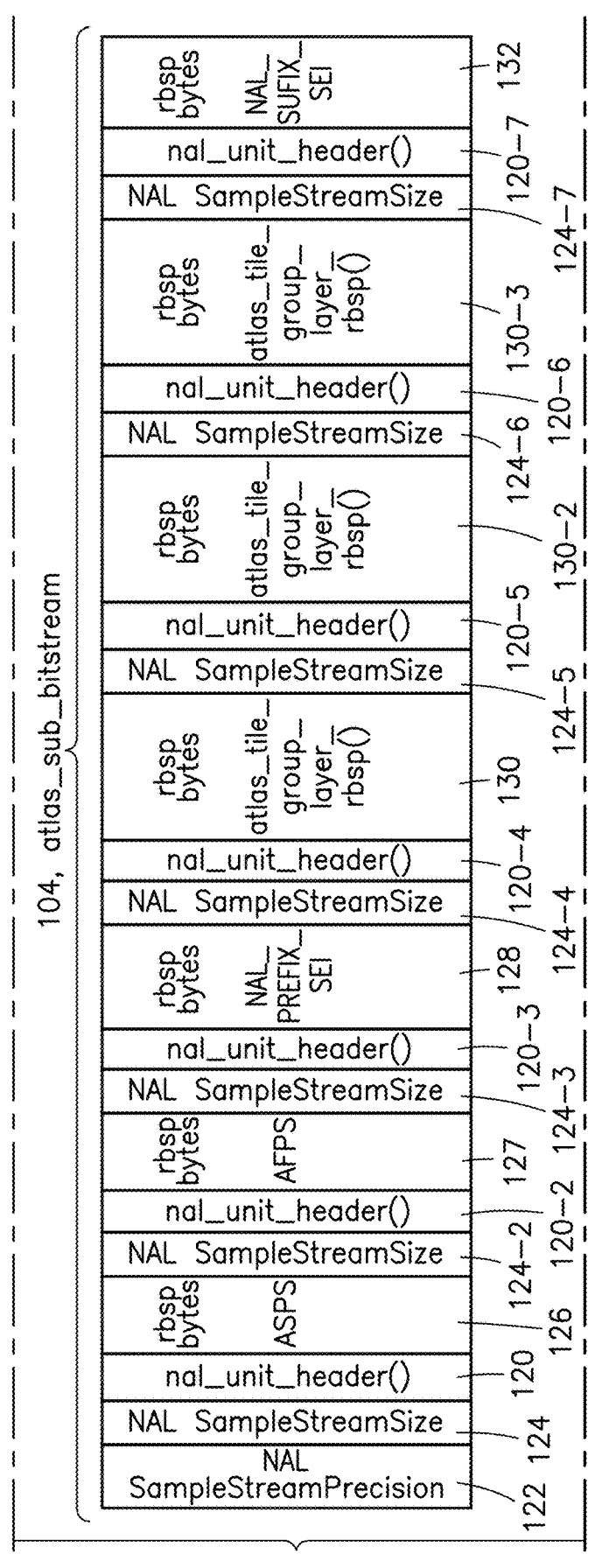
Figure 1C:
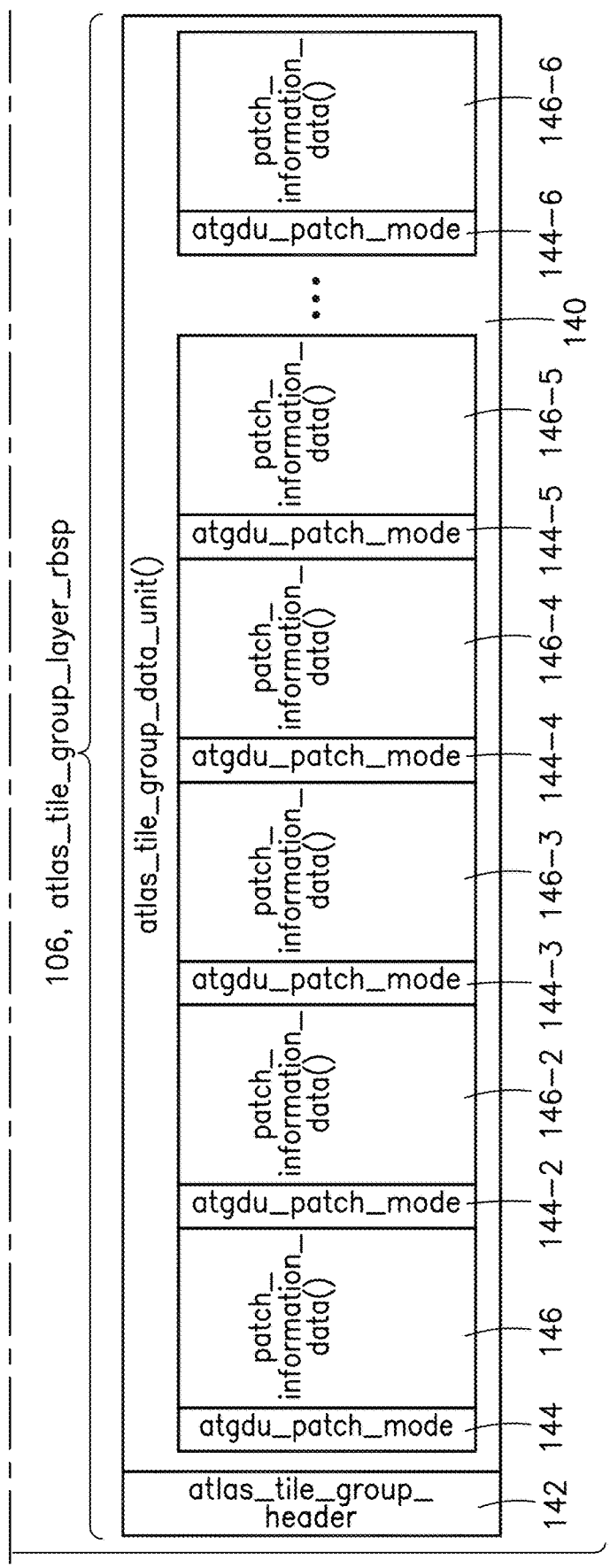

As defined in ISO/IEC 23090-5, a 3VC bitstream may contain one or more atlases. An atlas consists of an atlas metadata bitstream (atlas_sub_bitstream) and video encoded component bitstreams (video_sub_bitstreams). The atlas metadata bitstream carries patch layout information for related video encoded component bitstreams. To support signaling of shared parameter sets across atlases MIV introduced a concept of a special atlas or master atlas of specific type 0x3F. This master atlas only contains the atlas metadata bitstream where common parameters such as view or camera parameters may be signaled. FIG. 1A, FIG. 1B, and FIG. 1C (collectively FIG. 1) describes the 3VC bitstream structure 100 for a single atlas, where atlases are signaled in vpcc_unit_headers.

As shown in FIG. 1, the 3VC bitstream structure 100 includes a V-PCC bitstream 102, and atlas sub-bitstream 104, and an atlas tile group layer RBSP 106. Included in the V-PCC bitstream is a plurality of VPCC unit headers 110 (including 110-2, 110-3, 110-4, and 110-5), a VPCC sample stream precision 112, a plurality of VPCC sample stream sizes 114 (including 114-2, 114-3, 114-4, and 114-5), a VPS 115 associated with a VPCC unit payload, and atlas sub-bitstream 117 associated with a VPCC unit payload, and plurality of video sub-bitstreams (116-3, 116-4, and 116-5) each associated with a VPCC unit payload. As shown in FIG. 1, VPCC unit header 110 has a volumetric unit header type of VPCC_VPS for VPS, VPCC unit header 110-2 has a volumetric unit header type of VPCC_AD for atlas data, VPCC unit header 110-3 has a volumetric unit header type of VPCC_OVD for occupancy video data, VPCC unit header 110-4 has a volumetric unit header type of VPCC_VPS for GVD for geometry video data, and VPCC unit header 110-4 has a volumetric unit header type of VPCC_AVD for attribute video data. In some examples, size 114 corresponds to the size of items 110 and 115, size 114-2 corresponds to the size of items 110-2 and 117, size 114-3 corresponds to the size of items 110-3 and 116-3, size 114-4 corresponds to the size of items 110-4 and 116-4, and size 114-5 corresponds to the size of 110-5 and 116-5 (where for example the unit of size is the number of RBSP bytes).

As further shown in FIG. 1, atlas sub-bitstream 104 includes a NAL sample stream precision 122, a plurality of NAL sample stream sizes 124 (including 124-2, 124-3, 124-4, 124-5, 124-6, and 124-7), a plurality of NAL unit headers 120 (including 120-2, 120-3, 120-4, 120-5, 120-6, and 120-7), an ASPS 126 having a number of RBSP bytes, an AFPS 127 having a number of RBSP bytes, a NAL prefix SEI 128 having a number of RBSP bytes, a plurality of atlas tile group layer raw byte sequence payloads 130 (including 130-2 and 130-3) having a number of RBSP bytes, and a NAL suffix SEI 132 having a number of RBSP bytes. In some examples, size 124 corresponds to the size of items 120 and 126, size 124-2 corresponds to the size of items 120-2 and 127, size 124-3 corresponds to the size of items 120-3 and 128, size 124-4 corresponds to the size of items 120-4 and 130, size 124-5 corresponds to the size of 120-5 and 130-2, size 124-6 corresponds to the size of 120-6 and 130-3, and size 124-7 corresponds to the size of 120-7 and 132 (where for example the unit of size is the number of RBSP bytes).

As further shown in FIG. 1, the atlas tile group layer RBSP 106 includes an atlas tile group data unit 140, an atlas tile group header 142, a plurality of atlas tile group data unit patch modes 144 (including 144-2, 144-3, 144-4, 144-5, and 144-6), and a plurality of patch information data 146 (including 146-2, 146-3, 146-4, 146-5, and 146-6).

Over the course of the standardization process, the naming of the syntax structures and elements defined in ISO/IEC FDIS 23090-5 and ISO/IEC DIS 23090-12 has been modified in comparison to the terms used in this disclosure. However, the functionality of those structures and elements remains the same and the naming changes do not impact the ideas presented in this disclosure. Some of the notable name changes are: 3VC is renamed to V3C (Visual Volumetric Video-based Coding). V-PCC bitstream is V3C bitstream and all unit, header, and payload naming is changed accordingly. Atlas tile group layer was renamed to atlas tile layer and all syntax element names were modified accordingly.

From a file format perspective sequences of vpcc_units with different headers may be stored in separate tracks. Tracks with the same atlas_id may reference each other in order to establish a logical hierarchy. In addition, a master atlas may be used to provide a single entry point in the file. The master atlas may refer to other atlases as described in U.S. provisional application No. 62/959,449 (corresponding to U.S. nonprovisional application Ser. No. 17/140,580), entitled "Storage Of Multiple Atlases From One V-PCC Elementary Stream In ISOBMFF".

In addition to the patch information, in MIV in particular there is additional view metadata that describes the projection parameters, such as depth range and camera intrinsic and extrinsic parameters, for the patches. The patches in the patch atlas reference the view metadata by view id, and there are typically much fewer views than there are patches. In order to support the MIV multi-camera model, the 3VC bitstream supports a special "master atlas" that may only contain atlas metadata without an actual video bitstream.

Thus, each patch in a 3VC (V-PCC or MIV) atlas comes with sufficient metadata for determining whether that patch may be visible in a view of the scene rendered with given camera parameters. This view frustum culling of scene elements is a common rendering optimization in 3D graphics and can be applied to volumetric video as well. In MIV, view frustum culling can also be applied to each MIV view, enabling coarser (or more conservative) culling at the view level followed by further culling at the patch level. Culling may refer to removing or ignoring information that is not relevant, where extraction can be done for relevant information or irrelevant information. For example, consider the difference extracting a track from file versus culling a track from file.

In larger volumetric video scenes, the content may be too large for the client to access, decode, and/or render all at once. Larger scenes may typically be split into multiple video atlases in any case due to video decoder resolution limits, so it is desirable to facilitate partial access at the atlas level and/or use smaller partitions inside atlases.

HEVC supports highly flexible partitioning of a video sequence. Each frame of the sequence is split up into rectangular or square regions (Units or Blocks), each of which is predicted from previously coded data. After prediction, any residual information is transformed, and entropy encoded.

Each coded video frame, or picture, is partitioned into Tiles and/or Slices, which are further partitioned into Coding Tree Units (CTUs). The CTU is the basic unit of coding, analogous to the Macroblock in earlier standards, and can be up to 64×64 pixels in size.

Multiple Atlases in V-PCC elementary stream. After the MPEG 128 meeting the V-PCC elementary bitstream may contain more than one of an atlas. This functionality was added to carry data encoded according to the MIV specification (23090-12). In order to enable this functionality, vuh_atlas_id was added to V-PCC unit header for V-PCC units with types: VPCC_AD, VPCC_GVD, VPCC_OVD, and VPCC_AVD, corresponding respectively to Atlas Data, Geometry Video Data, Occupancy Video Data, and Attribute Video Data.

Addition of vuh_atlas_id creates implications in the design of a multi-track container structure when it comes to V-PCC Track:

- V-PCC sample allows only one V-PCC unit payload to be stored. Consequently, a V-PCC Track per atlas would have to be created.
- No functionality that links the number of V-PCC tracks to the same V-PCC elementary stream.
- No design for how VPCC_VPS would be stored (e.g. would it be duplicated per each V-PCC Track)
- No design to signal the main V-PCC track.
- No design to signal shared data between V-PCC tracks, like configurations.

V-PCC Component Tracks can be created without modification, as from their perspective vuh_atlas_id is yet another identifier of a track similar to vuh_unit_type, vuh_attribute_index, vuh_map_index, and vuh_attribute_dimension_index.

Object Annotation in 3VC 23090-5. In V-PCC it is possible to annotate each region of the volumetric bitstream, i.e. the patches or groups of patches that are identified using a "rectangular" shaped volumetric rectangle, with different information. This process may include whether these elements are associated with a particular object (likely an object in the physical/world space) and certain properties that could be useful for their extraction and rendering. Such information may include labeling of objects, the size and shape of the points that correspond to the object, whether the object is visible or not, visibility cone information, material ids, and collision information, among others.

Figure 2:
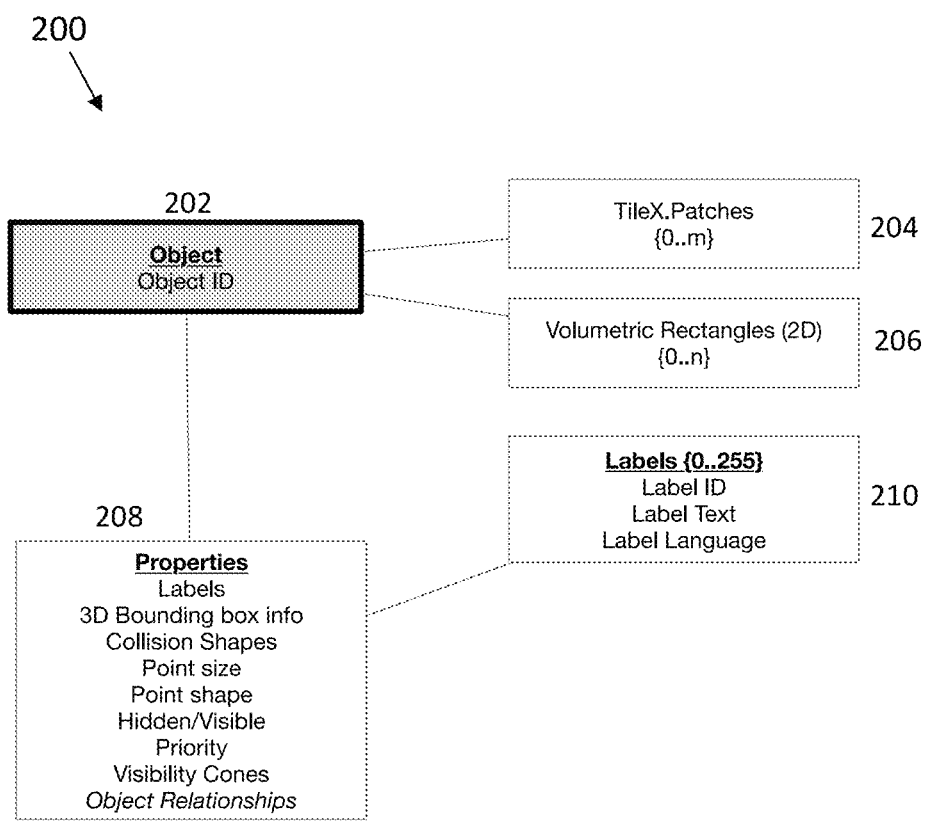
FIG. 2 is a diagram depicting relationships between objects and V-PCC elements (patches and volumetric 2D rectangles).

Such relationships can be seen in the diagram 200 of FIG. 2, where it is apparent that the relationships are similar to the ones encountered in "relational databases". Shown in FIG. 2 is an object 202, where object 202 has an object ID. The object 202 is associated with a tile/patch object 204, shown as TileX.Patches where a tile (indexed from 0 to m) may access patches by dereferencing the patches object. The object 202 is also associated with a plurality of 2D volumetric rectangles 206 (indexed from 0 to n). The object 202 has a number of properties 208 including, as shown in FIG. 2, labels, 3D bounding box information, collision shapes, point size, whether the object is hidden or visible, a priority, visibility cones, and object relationships. The properties 208 have labels 210, which in the example shown in FIG. 2 are indexed from 0 to 255, where each label has a label ID, label text, and a label language.

Objects may correspond to "real", i.e. physical, objects within a scene, or even conceptual objects that may relate to physical or other properties. Objects may be associated with different parameters, or properties (e.g. properties 208), which may also correspond to information provided during the creation or editing process of the point cloud, scene graph, etc. It is possible that some objects may relate to one another and in some cases an object could be part of another object.

An object could be persistent in time and could also be updated at any time/frame while the associated information may persist from that point onward. Multiple patches or 2D volumetric rectangles (e.g. rectangles 206), which can contain themselves multiple patches, could be associated with a single object, but there may be a desire to also associate the same patch or 2D volumetric rectangles with multiple objects. Such relationships could persist or also need to change in time because objects may move or their placement in the atlas may have changed.

Objects are listed in the scene object information SEI message:

| scene_object_information( payloadSize ) { | Descriptor |
|---|---|
|   soi_cancel_flag | u(1) |
|   soi_num_object_updates | ue(v) |
|   if ( soi_num_object_updates > 0 ) { | |
|     soi_simple_objects_flag | u(1) |
|     if ( soi_simple_objects_flag == 0) { | |
|       soi_object_label_present_flag | u(1) |
|       soi_priority_present_flag | u(1) |
|       soi_object_hidden_present_flag | u(1) |
|       soi_object_dependency_present_flag | u(1) |
|       soi_visibility_cones_present_flag | u(1) |
|       soi_3d_bounding_box_present_flag | u(1) |
|       soi_collision_shape_present_flag | u(1) |
|       soi_point_style_present_flag | u(1) |
|       soi_material_id_present_flag | u(1) |
|       soi_extension_present_flag | u(1) |
|     } | |
|     else { | |
|       soi_object_label_present_flag = 0 | |
|       soi_priority_present_flag = 0 | |
|       soi_object_hidden_present_flag = 0 | |
|       soi_object_dependency_present_flag = 0 | |
|       soi_visibility_cones_present_flag = 0 | |
|       soi_3d_bounding_box_present_flag = 0 | |
|       soi_collision_shape_present_flag = 0 | |
|       soi_point_style_present_flag = 0 | |
|       soi_material_id_present_flag = 0 | |
|       soi_extension_present_flag = 0 | |
|     } | |
|     if (soi_3d_bounding_box_present_flag) { | |
|       soi_3d_bounding_box_scale_log2 | u(5) |
|       soi_3d_bounding_box_precision_minus8 | u(5) |
|     } | |
|     soi_log2_max_object_idx_updated | u(5) |
|     if( soi_object_dependency_present_flag ) | |
|       soi_log2_max_object_dependency_idx | u(5) |
|     for( i = 0; i <= soi_num_object_updates; i++ ) { | |

-continued

| scene_object_information( payloadSize ) { | Descriptor |
|---|---|
|     soi_object_idx[ i ] | u(v) |
|     k = soi_object_idx[ i ] | |
|     soi_object_cancel_flag[ k ] | u(1) |
|     ObjectTracked[ k ] = ! pi_object_cancel_flag[ k ] ] | |
|     if (!soi_object_cancel_flag[ k ]) { | |
|         if( soi_object_label_present_flag) { | |
|             soi_object_label_update_flag[ k ] | u(1) |
|             if( soi_object_label_update_flag[ k ] ) | |
|                 soi_object_label_idx[ k ] | ue(v) |
|         } | |
|         if( soi_priority_present_flag ) { | |
|             soi_priority_update_flag[ k ] | u(1) |
|             if( soi_priority_update_flag[ k ] ) | |
|                 soi_priority_value[ k ] | u(4) |
|         } | |
|         if( soi_object_hidden_present_flag ) | |
|             soi_object_hidden_flag[ k ] | u(1) |
|         if( soi_object_dependency_present_flag ) { | |
|             soi_object_dependency_update_flag[ k ] | u(1) |
|             if (soi_object_dependency_update_flag[ k ]) { | |
|                 soi_object_num_dependencies[ k ] | u(4) |
|                 for( j = 0; j < soi_object_num_dependencies[ k ]; j++ ) | |
|                     soi_object_dependency_idx[ k ][ j ] | u(v) |
|             } | |
|         } | |
|         if( soi_visibility_cones_present_flag ) { | |
|             soi_visibility_cones _update_flag[ k ] | u(1) |
|             if( soi_visibility_cones_update_flag[ k ]) { | |
|                 soi_direction_x[ k ] | u(32) |
|                 soi_direction_y[ k ] | u(32) |
|                 soi_direction_z[ k ] | u(32) |
|                 soi_angle[ k ] | u(16) |
|             } | |
|         } | |
|         if( soi_3d_bounding_box_present_flag ) { | |
|             soi_3d_bounding_box_update_flag[ k ] | u(1) |
|             if( soi_3d_bounding_box_update_flag[ k ]) { | |
|                 soi_3d_bounding_box_x[ k ] | u(v) |
|                 soi_3d_bounding_box_y[ k ] | u(v) |
|                 soi_3d_bounding_box_z[ k ] | u(v) |
|                 soi_3d_bounding_box_delta_x[ k ] | u(v) |
|                 soi_3d_bounding_box_delta_y[ k ] | u(v) |
|                 soi_3d_bounding_box_delta_z[ k ] | u(v) |
|             } | |
|         } | |
|         if( soi_collision_shape_present_flag ) { | |
|             soi_collision_shape_update_flag[ k ] | u(1) |
|             if (soi_collision_shape_update_flag[ k] ]) | |
|                 soi_collision_shape_id[ k ] | u(16) |
|         } | |
|         if( soi_point_style_present_flag ) { | |
|             soi_point_style_update_flag[ k ] | u(1) |
|             if (soi_point_style_update_flag[ k ] ]) | |
|                 soi_point_shape_id[ k ] | u(8) |
|                 soi_point_size[ k ] | u(16) |
|         } | |
|         if( soi_material_id_present_flag ) { | |
|             soi_material_id_update_flag[ k ] | u(1) |
|             if (soi_material_id_update_flag[ k] ]) | |
|                 soi_material_id[ k ] | u(16) |
|         } | |
|     } | |
|     } | |
|   } | |
| } | |

Objects are mapped to tiles and patches using the patch information SEI message:

| patch_information ( payload_size ) { | Descriptor |
|---|---|
|    pi_cancel_flag | u(1) |
|    pi_num_tile_group_updates | ue(v) |
|    if ( pi_num_tile_group_updates > 0 ) { | ue(v) |
|       pi_log2_max_object_idx_tracked | u(5) |
|       pi_log2_max_patch_idx_updated | u(4) |
|    } | |
|    for( i = 0; i <= pi_num_tile_group_updates; i++ ) { | |
|       pi_tile_group_address[ i ] | ue(v) |
|       j = pi_tile_group_address[ i ] | |
|       pi_tile_group_cancel_flag[ j ] | u(1) |
|       pi_num_patch_updates[ j ] | ue(v) |
|       for( k = 0; k < pi_num_patch_updates[ j ]; k++ ) { | |
|          pi_patch_idx[ j ][ k ] | u(v) |
|          p = pi_patch_idx[ j ][ k ] | |
|          pi_patch_cancel_flag[ j ][ p ] | u(1) |
|          if( !pi_patch_cancel_flag[ j ][ p ] ) { | |
|             pi_patch_number_of_objects_minusl[ j ][ p ] | ue(v) |
|             m = pi_patch_number_of_objects_minus1[ j ][ p ] +1 | |
|             for (n = 0; n < m; n++) | |
|                pi_patch_object_idx[ j ][ p ][ n ] | u(v) |
|          } | |
|       } | |
|    } | |
| } | |

For a more detailed description of structure presented in FIG. 2 see input contribution m52705 to MPEG 129 meeting, Brussels, January, 2020.

Multiple camera views in 3VC 23090-5 and MIV 23090-12. In contrast to a fixed number of the camera views, in the MIV specification a camera number, and camera extrinsic and camera intrinsic information is not fixed and may change on a group of picture basis (e.g., GOP). In order to address this in the 3VC specification, 23090-12 introduces in WD4 of the specification an adaptation params structure that can carry this information. Adaptation params are carried by an NAL unit with a particular NAL unity type. In case there is more than one atlas in 3VC then this adaptation params is carried in an atlas with a unique value of atlas_id equal to 0x3F.

The adaptation params structure is as follows:

| adaptation_params_rbsp( ) { | Descriptor |
|---|---|
|    ap_id | ue(v) |
|    ap_camera_params_present_flag | u(1) |
|    if( ap_camera_params_present_flag ) | |
|       camera_params( ) | |
|    ap_extension_bit_equal_to_one | f(1) |
|    ap_miv_view_params_list_present_flag | u(1) |
|    if( ap_miv_view_params_list_present_flag ) { | |
|       ap_miv_view_params_list_update_mode | u(2) |
|       if( ap_miv_view_params_list_present_mode == VPL_INITLIST ) | |
|          miv_view_params_list( ) | |
|       else if( ap_miv_view_params_list_present_mode == VPL_UPD_EXT ) | |
|          miv_view_params_update_extrinsics( ) | |
|       else if( ap_miv_view_params_list_present_mode == VPL_UPD_INT ) | |
|          miv_view_params_update_intrinsics( ) | |
|       else if( ap_miv_view_params_list_present_mode == VPL_EXT_INT ) { | |
|          miv_view_params_update_extrinsics( ) | |
|          miv_view_params_update_intrinsics( ) | |
|       } | |

-continued

| adaptation_params_rbsp( ) { | Descriptor |
|---|---|
|    } | |
|    ap_extension2_flag | u(1) |
|    if( ap_extension2_flag ) { | |
|       while ( more_rbsp_data( ) ) | |
|          ap_extension_data_flag | u(1) |
|    rbsp_trailing_bits( ) | |
| } | |

Each camera (view) has a unique index and determined within miv_view_params_list.

| miv_view_params_list( ) { | Descriptor |
|---|---|
|    mvp_num_views_minus1 | u(16) |
|    for( v = 0; v <= num_views_minus1; v++ ) | |
|       camera_extrinsics( v ) | |
|    mvp_intrinsic_params_equal_flag | u(1) |
|    for( v = 0; v <= mvp_intrinsic_params_equal_flag ? 0 : mvp_num_views_minus1; v++ ) | |
|       camera intrinsics( v ) | |
|    mvp_depth_quantization_params_equal_flag | u(1) |
|    for( v = 0; v <= mvp_depth_quantization_equal_flag ? 0 : mvp_num_views_minus1; v++ ) | |
|       depth_quantization( v) | |
|    mvp_pruning_graph_params_present_flag | u(1) |
|    if ( mvp_pruning_graph_params_present_flag ) | |
|       for( v = 0; v <= mvp_num_views_minus1; v++ ) | |
|          pruning_children( v) | |
| } | |

Partial Access in V-PCC ISOBMFF. The CD text of 23090-10 also introduces a high level solution for partial access to 3-dimensional space where tracks are grouped based on what the spatial region data in those tracks belong to. The specification does not mention, however, whether those tracks are from one V-PCC elementary stream or from independent V-PCC elementary streams. In the case of being from one V-PCC elementary stream, the tool would allow only to split video tracks (occupancy, geometry, attribute) based on what the spatial region data in those tracks belong to. The atlas data in V-PCC track remains in its original form. Consequently, all atlas data needs to be downloaded/decoded even if only one spatial region is displayed to the end user. Splitting the atlas data into a number of atlases that correspond to some spatial regions would help the partial access scenario.

However, as mentioned above, the storage of multiple atlases in a multi-track container structure is not fully supported. U.S. provisional application No. 62/959,449 (corresponding to U.S. nonprovisional application Ser. No. 17/140,580), entitled "Storage Of Multiple Atlases From One V-PCC Elementary Stream In ISOBMFF", aims to clarify these concepts.

Box-structured file formats. Box-structured and hierarchical file format concepts have been widely used for media storage and sharing. The most well-known file formats in this regard are the ISO Base Media File Format (ISOBMFF, ISO/IEC 14496-12) and its variants such as MP4 and 3GPP file formats.

ISOBMFF allows storage of timely captured audio/visual media streams, called media tracks. The metadata which describes the track is separated from the encoded bitstream itself. The format provides mechanisms to access media data in a codec-agnostic fashion from a file parser perspective.

A 3VC (V-PCC/MIV) bitstream, containing a coded point cloud sequence (CPCS), is composed of VPCC units carrying V-PCC parameter set (VPS) data, an atlas information bitstream, and 2D video encoded bitstreams (e.g. an occupancy map bitstream, a geometry bitstream, and zero or more attribute bitstreams). A 3VC (V-PCC/MIV) bitstream can be stored in an ISOBMFF container according to ISO/IEC 23090-10. Two modes are supported: single-track container and multi-track container.

Single-track container is utilized in the case of simple ISOBMFF encapsulation of a V-PCC encoded bitstream. In this case, a V-PCC bitstream is directly stored as a single track without further processing. Single-track should use a sample entry type of 'vpe1' or 'vpeg'.

Under the 'vpe1' sample entry, all atlas parameter sets (as defined in ISO/IEC 23090-5) are stored in the setupUnit of sample entry. Under the 'vpeg' sample entry, the atlas parameter sets may be present in setupUnit array of sample entry, or in the elementary stream.

Multi-track container maps V-PCC units of a 3VC (V-PCC/MIV) elementary stream to individual tracks within the container file based on their types. There are two types of tracks in a multi-track container: V-PCC track and V-PCC component track. The V-PCC track is a track carrying the volumetric visual information in the V-PCC bitstream, which includes the atlas sub-bitstream and the atlas sequence parameter sets. V-PCC component tracks are restricted video scheme tracks which carry 2D video encoded data for the occupancy map, geometry, and attribute sub-bitstreams of the 3VC (V-PCC/MIV) bitstream. Multi-track should use for V-PCC track a sample entry type of 'vpc1' or 'vpcg'.

Under the 'vpc1' sample entry, all atlas parameter sets (as defined in ISO/IEC 23090-5) shall be in the setupUnit array of sample entry. Under the 'vpcg' sample entry, the atlas parameter sets may be present in this array, or in the stream.

In large and/or complex scenes, it is highly desirable to implement partial access at the atlas level so that entire atlases can be ignored if they are not necessary for rendering during the current intra period. This enables savings both in the network streaming layer as well as the video decoder layer.

Atlas culling is not currently possible, however. While the view metadata is available in the "master atlas" and each view can be culled against the rendering view frustum, the connection to the actual scene data corresponding to each view is through the patch metadata that resides in each atlas metadata bitstream.

Thus, every atlas metadata bitstream must be accessed before it is possible to determine whether a given atlas is relevant for the client at a given moment. This makes at least network streaming optimizations impossible, and hinders optimization of bitstream parsing and decoding in general.

U.S. provisional application No. 62/959,449 (corresponding to U.S. nonprovisional application Ser. No. 17/140,580), entitled "Storage Of Multiple Atlases From One V-PCC Elementary Stream In ISOBMFF", clarifies how metadata for different atlases may be signaled inside a single bitstream or track.

Described herein are three alternative and complementary embodiments to address the problem:
 adding view-to-atlas mapping metadata to enable culling of sub-bitstreams via per-view visibility culling
 adding object-to-atlas mapping metadata to enable culling of sub-bitstreams via per-object visibility culling
 moving patch atlas metadata to the MIV "master" atlas to enable more fine-grained patch visibility culling, leading to more effective culling of atlas sub-bitstreams
 leveraging 3VC partial access metadata to implement atlas bitstream culling
  store each atlas in its own track and provide sample grouping information to allow atlas bitstream culling on a file format level These embodiments can be used individually or in combination with each other. Corresponding encoder embodiments are also described.

1. View-to-atlas mapping metadata. In one embodiment, the adaptation_params_rbsp structure that contains MIV related view metadata is contained in the universally accessible "master" atlas (i.e. the atlas with vuh_atlas_id equal to 0x3F). New elements in the adaptation_params_rbsp structure are added to provide information about mapping from views to atlases. This mapping may indicate, for every view, the atlas that contains patches referring back to the view in question.

The renderer may apply view frustum culling to each view first. All views that are deemed potentially visible may then be queried for the atlas mapping metadata, and the combined atlas mapping metadata may indicate the atlases that must be accessed in order to render the visible views.

The mapping metadata can be, for example, a bitmask of N bits, where N is the number of atlas sub-bitstreams. Each bit in the mask therefore corresponds to one atlas. In each view, the mask may have a bit set for every atlas if the atlas corresponding to the bit contains patches for that view, and a bitwise OR operation over the potentially visible views may produce the combined bitmask. As an example, the bitmask may be embedded in the miv_view_params_list( ) sub-structure of the adaptation_params_rbsp( ) structure in 3VC.

The example modified miv_view_params_list( ) sub-structure is as follows:

| miv_view_params_list( ) { | Descriptor |
|---|---|
| mvp_num_views_minus1 | u(16) |
| for( v = 0; v <= num_views_minus1; v++ ) { | |
| camera_extrinsics( v ) | |
| mvp_atlas_map_flag | u(1) |
| if(mvp_atlas_map_flag) | |
| mvp_atlas_map_mask | u(v) |
| } | |
| mvp_intrinsic_params_equal_flag | u(1) |
| for( v = 0; v <= mvp_intrinsic_params_equal_flag ? 0 : mvp_num_views_minus1; v++ ) | |
| camera_intrinsics( v ) | |
| mvp_depth_quantization_params_equal_flag | u(1) |
| for( v = 0; v <= mvp_depth_quantization_equal_flag ? 0 : mvp_num_views_minus1; v++ ) | |
| depth_quantization( v ) | |
| mvp_pruning_graph_params_present_flag | u(1) |
| if ( mvp_pruning_graph_params_present_flag | ) |
| for( v = 0; v <= mvp_num_views_minus1; v++ ) | |
| pruning_children( v) | |
| } | |

The newly added mvp_atlas_map_flag indicates whether atlas map mask information is available for given view.

The newly added mvp_atlas_map_mask contains the bitmask of atlases where patches linking to the given view may be found. The length of the bitmask depends on the number of atlases, i.e. vps_atlas_count_minus1 as defined in ISO/IEC 23090-5.

FIG. 3 also shows the example modified miv_view_params_list( ) sub-structure 300 of the adaptation_params_rbsp( ) structure in 3VC, with the modification highlighted as item 302.

In another embodiment, a temporal update of the atlas map can be done together with a camera extrinsic in the sub-structure miv_view_params_update_extrinsics( ) of the adaptation_params_rbsp( ) structure in 3VC. An example modified miv_view_params_update_extrinsics( ) structure is as follows:

| miv_view_params_update_extrinsics( ) { | Descriptor |
|---|---|
| mvpue_num_view_updates_minus1 | u(16) |
| for( i = 0; i <= mvpue_num_views_updates_minus1; i++ ) { | |
| mvpue_view_idx[ i ] | u(16) |
| camera_extrinsics( mvpue_view_idx[ i ] ) | |
| mvpue_atlas_map_flag | u(1) |
| if(mvpue_atlas_map_flag) | |
| mvpue_atlas_map_mask | u(v) |
| } | |
| } | |

The newly added mvpue_atlas_map_flag indicates whether atlas map mask information is available for a given view.

The newly added mvpue_atlas_map_mask contains the bitmask of atlases where patches linking to the given view may be found. The length of the bitmask depends on the number of atlases, i.e. vps_atlas_count_minus1 as defined in 23090-5.

FIG. 4 also shows the example modified miv_view_params_update_extrinsics( ) sub-structure 400 of the adaptation_params_rbsp( ) structure in 3VC, with the modification highlighted as item 402.

In another embodiment, a temporal update is done as a newly added structure miv atlas map update( ) of the adaptation_params_rbsp( ) structure in 3VC. An example modified adaptation_params_rbsp( ) structure is as follows:

| adaptation_params_rbsp( ) { | Descriptor |
|---|---|
| ap_jd | ue(v) |
| ap_camera_params_present_flag | u(1) |
| if( ap_camera_params_present_flag ) | |
| camera_params( ) | |
| ap_extension_bit_equal_to_one | f(1) |
| ap_miv_view_params_list_present_flag | u(1) |
| if( ap_miv_view_params_list_present_flag ) { | |
| ap_miv_view_params_list_update_mode | u(2) |
| if( ap_miv_view_params_list_present_mode == VPL_INITLIST ) | |
| miv_view_params_list( ) | |
| else if( ap_miv_view_params_list_present_mode == VPL_UPD_EXT ) | |
| miv_view_params_update_extrinsics( ) | |
| else if( ap_miv_view_params_list_present_mode == VPL_UPD_INT ) | |
| miv_view_params_update_intrinsics( ) | |
| else if( ap_miv_view_params_list_present_mode == VPL_EXT_INT ) { | |
| miv_view_params_update_extrinsics( ) | |
| miv_view_params_update_intrinsics( ) | |
| } | |
| } | |
| miv_atlas_map_update_flag | u(1) |
| if(miv_atlas_map_update_flag) | |
| miv_atlas_map_update( ) | |
| ap_extension2 _flag | u(1) |

| adaptation_params_rbsp( ) { | Descriptor |
|---|---|
| if( ap_extension2 _flag ) { | |
| while ( more_rbsp_data( ) ) | |
| ap_extension_data_flag | u(1) |
| rbsp_trailing_bits( ) | |
| } | |

FIG. 5 also shows the example modified adaptation_params_rbsp( ) structure 500 in 3VC, with the modification highlighted as item 502 which includes a new structure miv_atlas_map_update( ).

An example miv_atlas_map_update( ) structure is as follows.

| miv_atlas_map_update( ){ | Descriptor |
|---|---|
| mvpue_num_view_updates_minus1 | u(16) |
| for( i = 0; i <= mamue_num_views_updates_minus1; i++ ) { | |
| mvpue_view_idx[ i ] | u(16) |
| mvpue_atlas_map_mask | u(v) |
| } | |
| } | |

Figure 6:
FIG. 6 shows an example miv atlas map update( ) structure.

FIG. 6 also shows the example miv_atlas_map_update( ) structure 600.

In another embodiment, the encoder may optimize the patch layout so that patches belonging to a certain view are grouped together in a single atlas. This makes the view-based culling of atlases more effective.

2. Object-to-atlas mapping metadata. In one embodiment, a patch information SEI message is extended to include an atlas map element that would inform a renderer in what other atlases the object is present. Each object can have visibility information, and a renderer can perform culling based on this information. Based on the object description and information in which atlases' patches describing the object are present, a renderer could request the needed atlases (that can be mapped to tracks) from a file parser. An example modified patch_information(payload_size) structure is provided below.

| patch_information ( payload_size ) { | Descriptor |
|---|---|
| pi_cancel_flag | u(1) |
| pi_num_tile_group_updates | ue(v) |
| if ( pi_num_tile_group_updates > 0 ) { | ue(v) |
| pi_log2_max_object_idx_tracked | u(5) |
| pi_log2_max_patch_idx_updated | u(4) |
| } | |
| for( i = 0; i <= pi_num_tile_group_updates; i++ ) { | |
| pi_tile_group_address[ i ] | ue(v) |
| j = pi_tile_group_address[ i ] | |
| pi_tile_group_cancel_flag[ j ] | u(1) |
| pi_num_patch_updates[ j ] | ue(v) |
| for( k = 0; k < pi_num_patch_updates[ j ]; k++ ) { | |
| pi_patch_idx[ j ][ k ] | u(v) |
| p = pi_patch_idx[ j ][ k ] | k] |
| pi_patch_cancel_flag[ j ][ p ] | u(1) |
| if( !pi_patch_cancel_flag[ j ][ p ] ) { | |
| pi_patch_number_of_objects_minus1[ j ][ p ] | ue(v) |
| m = pi_patch_number_of_objects_minus1[ j ][ p ] + 1 | |

-continued

| patch_information ( payload_size ) { | Descriptor |
|---|---|
|     for (n = 0; n < m; n++ ) | |
|         pi_patch_object_idx[ j ][ p ][ n ] | u(v) |
|         pi_patch_atlas_map_mask | u(v) |
|     } | |
|   } | |
|  } | |
| } | |

The newly added pi_patch_atlas_map_mask contains the bitmask of atlases where patches linking to the given object can be found. The length of the bitmask depends on the number of atlases, i.e. vps_atlas_count_minus1 as defined in ISO/IEC 23090-5.

FIG. 7 also shows the example modified patch information SEI message 700, with the modification highlighted as item 702.

In another embodiment, the scene object information SEI message is contained in the universally accessible "master" atlas (i.e. atlas with vuh_atlas_id equal to 0x3F). The scene object information SEI message is extended to provide mapping of object IDs to atlases. This metadata may indicate, for every object, the atlas that contains patches referring back to the object in question.

An example modified scene_object_information(payloadSize) SEI message is as follows.

| scene_object_information( payloadSize ) { | Descriptor |
|---|---|
|   soi_cancel_flag | u(1) |
|   soi_num_object_updates | ue(v) |
|   if ( soi_num_object_updates > 0 ) { | |
|     soi_simple_objects_flag | u(1) |
|     if ( soi_simple_objects_flag == 0) { | |
|       soi_object_label_present_flag | u(1) |
|       soi_priority_present_flag | u(1) |
|       soi_object_hidden_present_flag | u(1) |
|       soi_object_dependency_present_flag | u(1) |
|       soi_visibility_cones_present_flag | u(1) |
|       soi_3d_bounding_box_present_flag | u(1) |
|       soi_collision_shape_present_flag | u(1) |
|       soi_point_style_present_flag | u(1) |
|       soi_material_id_present_flag | u(1) |
|       soi_extension_present_flag | u(1) |
|     } | |
|     else { | |
|       soi_object_label_present_flag = 0 | |
|       soi_priority_present_flag = 0 | |
|       soi_object_hidden_present_flag = 0 | |
|       soi_object_dependency_present_flag = 0 | |
|       soi_visibility_cones_present_flag = 0 | |
|       soi_3d_bounding_box_present_flag = 0 | |
|       soi_collision_shape_present_flag = 0 | |
|       soi_point_style_present_flag = 0 | |
|       soi_material_id_present_flag = 0 | |
|       soi_extension_present_flag = 0 | |
|     } | |
|     if (soi_3d_bounding_box_present_flag) { | |
|       soi_3d_bounding_box_scale_log2 | u(5) |
|       soi_3d_bounding_box_precision_minus8 | u(5) |
|     } | |
|     soi_log2_max_object_idx_updated | u(5) |
|     if( soi_object_dependency_present_flag ) | |
|       soi_log2_max_object_dependency_idx | u(5) |
|     for( i = 0; i <= soi_num_object_updates; i++ ) { | |
|       soi_object_idx[ i ] | u(v) |
|       soi_object_atlas_map_mask | u(v) |
|       k = soi_object_idx[ i ] | |
|       soi_object_cancel_flag[ k ] | u(1) |
|       ObjectTracked[ k ] =! pi_object_cancel_flag[ k ] ] | |
|       if (!soi_object_cancel_flag[ k ]) { | |
|         if( soi_object_label_present_flag) { | |
|           soi_object_label_update_flag[ k ] | u(1) |
|           if( soi_object_label_update_flag[ k ] ) | |
|             soi_object_label_idx[ k ] | ue(v) |
|         } | |
|         if( soi_priority_present_flag ) { | |
|           soi_priority_update_flag[ k ] | u(1) |
|           if( soi_priority_update_flag[ k ] ) | |
|             soi_priority_value[ k ] | u(4) |
|         } | |
|         if( soi_object_hidden_present_flag ) | |
|           soi_object_hidden_flag[ k ] | u(1) |
|         if( soi_object_dependency_present_flag ) { | |
|           soi_object_dependency_update_flag[ k ] | u(1) |
|           if (soi_object_dependency_update_flag[ k ]) { | |
|             soi_object_num_dependencies[ k ] | u(4) |
|             for( j = 0; j <  soi_object_num_dependencies[ k ]; j++ ) | |

| scene_object_information( payloadSize ) { | Descriptor |
|---|---|
|                 soi_object_dependency_idx[ k ] [ j ] | u(v) |
|            } | |
|         } | |
|         if( soi_visibility_cones_present_flag ) { | |
|             soi_visibility_cones_update_flag[ k ] | u(1) |
|             if( soi_visibility_cones_update_flag[ k ]) { | |
|                 soi_direction_x[ k ] | u(32) |
|                 soi_direction_y[ k ] | u(32) |
|                 soi_direction_z[ k ] | u(32) |
|                 soi_angle[ k ] | u(16) |
|            } | |
|         } | |
|         if( soi_3d_bounding_box_present_flag ) { | |
|             soi_3d_bounding_box_update_flag[ k ] | u(1) |
|             if( soi_3d_bounding_box_update_flag[ k ]) { | |
|                 soi_3d_bounding_box_x[ k ] | u(v) |
|                 soi_3d_bounding_box_y[ k ] | u(v) |
|                 soi_3d_bounding_box_z[ k ] | u(v) |
|                 soi_3d_bounding_box_delta_x[ k ] | u(v) |
|                 soi_3d_bounding_box_delta_y[ k ] | u(v) |
|                 soi_3d_bounding_box_delta_z[ k ] | u(v) |
|            } | |
|         } | |
|         if( soi_collision_shape_present_flag ) { | |
|             soi_collision_shape_update_flag[ k ] | u(1) |
|             if (soi_collision_shape_update_flag[ k] ]) | |
|                 soi_collision_shape_id[ k ] | u(16) |
|         } | |
|         if( soi_point_style_present_flag ) { | |
|             soi_point_style_update_flag[ k ] | u(1) |
|             if (soi_point_style_update_flag[ k] ]) | |
|                 soi_point_shape_id[ k ] | u(8) |
|                 soi_point_size[ k ] | u(16) |
|         } | |
|         if( soi_material_id_present_flag ) { | |
|             soi_material_id_update_flag[ k ] | u(1) |
|             if (soi_material_id_update_flag[ k] ]) | |
|                 soi_material_id[ k ] | u(16) |
|         } | |
|        } | |
|      } | |
|    } | |
| } | |

The newly added soi_object_atlas_map_mask contains the bitmask of atlases where patches linking to the given object can be found. The length of the bitmask depends on the number of atlases, i.e. vps_atlas_count_minus1 as defined in ISO/IEC 23090-5.

FIG. 8A, FIG. 8B, and FIG. 8C also show the example modified scene object information SEI message as collectively items 800, 810, and 820, with the modification highlighted as item 802 within FIG. 8B. Collectively FIG. 8A, FIG. 8B, and FIG. 8C are FIG. 8.

3. Grouping of patch metadata to MIV "master atlas". In the MIV bitstream format, a special atlas with a predefined atlas ID is specified to contain view metadata, while the patch metadata is contained in per-atlas metadata units. In this embodiment, these per-atlas metadata units are moved from separate atlases to the "master atlas" in order to make them universally available. The signaling related aspects of this embodiment are largely covered in U.S. provisional application No. 62/959,449 (corresponding to U.S. nonprovisional application Ser. No. 17/140,580), entitled "Storage Of Multiple Atlases From One V-PCC Elementary Stream In ISOBMFF". The novelty of this embodiment includes the decoding process, which allows a decoder to cull whole atlases based on patch metadata.

In this embodiment, the renderer may cull all patches against the current rendering viewing frustum, and decode only the atlas sub-bitstreams that contain potentially visible patches. This can be implemented in several ways, of which two examples are:

loop over all patch atlases, detect potentially visible patches, and once a first potentially visible patch is found, mark that atlas as required and move to the next one, or perform the view culling of Embodiment 1 (1. View-to-atlas mapping metadata) first, then process only patches referring to a potentially visible view, and mark the relevant atlases as required After finding the required atlases, access to those may continue as in Embodiment 1 (1. View-to-atlas mapping metadata), potentially via a network request before decoding the relevant atlas sub-bitstream.

4. 3VC partial access-based embodiment. In MPEG #129 partial access related functionality in 3VC was adopted. However, the signaling on file format level has not been defined. Considering the embodiments 1, 2, 3 (respectively 1. View-to-atlas mapping metadata, 2. Object-to-atlas mapping metadata, 3. Grouping of patch metadata to MTV "master atlas") where atlas culling is performed using information on views, objects, or patches, this embodiment focuses on atlas culling using partial access functionality by providing file format level design.

Input contribution to MPEG 129 meeting m52705 defines partial access functionality, which consists of concepts for defining objects with various characteristics, including visibility cones and bounding boxes as well as linking objects with other objects, tile groups, patches and volumetric rectangles.

In one embodiment, the V-PCC bitstream containing the coded point cloud sequence (OPCS) that is composed of VPCC units carrying V-PCC parameter set (VPS) data, more than one atlas bitstream, and more than one 2D video encoded bitstreams is stored in ISOBMFF. An example of such V-PCC bitstream is one carrying volumetric video compressed according to MPEG Immersive Media defined in of ISO/IEC 23090-12.

In case the V-PCC bitstream contains multiple atlases, each atlas bitstream is encapsulated in a separate V-PCC track. One of those tracks is interpreted as a parameter track that is part of the multi-atlas V-PCC bitstream, while other tracks are interpreted as normal V-PCC tracks that are part of the multi-atlas V-PCC bitstream.

A V-PCC track is part of the multi-atlas V-PCC bitstream when it contains a 'mapt' track reference to another V-PCC track and has a sample entry type equal to 'vpc1' or 'vpcg'. This referenced track is referred to as the parameter track of the multi-atlas V-PCC bitstream and could have a sample entry type equal to 'vpcP'.

A parameter track does not include ACL NAL units. A normal track does not carry ACL NAL units belonging to more than one atlas. For any V-PCC access unit carried by samples in a parameter track and a number of normal tracks, all the atlas NAL units that apply to the entire V-PCC access unit are carried in the parameter track. These atlas NAL units include (but are not limited to) adaptation_params_rbsp, SEI messages as well as EOB and EOS NAL units, when present. The atlas NAL units that do not apply to a given atlas are not carried in the normal track containing that atlas. The NAL units that apply to an atlas are carried in the normal track containing that atlas.

In another embodiment, in order to enable a view-frustum culling, i.e. culling objects outside of the user's current view of the scene, a sample groups is defined. It provides a mapping of an atlas to a view. Due to the use of a sample group (or one or more sample groups), the mapping can change along the timeline of the volumetric video.

View Information Sample Group Entry
Definition
Box Type: 'vpvi'
Container: Sample Group Description Box ('sgpd')
Mandatory: No
Quantity: Zero or more A view information sample group entry identifies which views are carried by samples. The grouping_type_parameter is not defined for the SampleToGroupBox with grouping type 'vpvi'. A view information sample group entry may also provide information in which other track, atlases, or tile group samples with data containing the same view is carried.
Syntax

```
aligned (8) class ViewInformationSampleGroupEntry extends
VisualSampleGroupEntry ('vpvi', version = 0, flags) {
    unsigned int(8) group_id;
    unsigned int(8) num_views;
    for(i=0; i < num_views; i++) {
        unsigned int(8) view_index;
        unsigned int(8) num_atlases;
        for(j=0; j < num_atlases; j++) {
            unsigned int(32) atlas_id;
            unsigned int(32) num_tile_groups
            for(k=0; k < num_tile_groups; k++) {
```

-continued

```
                unsigned int(32) tile_groups_address;
            }
        }
    }
}
```

Semantics group_id specifies the unique identifier of the group.

num_views specifies the number of views carried by samples.

view_index specifies the index of a view carried by samples. The index is mapped to view index in the active adaptation_params_rbsp.

num_atlases specifies the number of atlases, other than the atlas contained in the track the sample group belongs to, that contain samples with the view with the index equal to view index.

atlas_id specifies the id of an atlas that contains samples with the view with the index equal to view index.

num_tile_groups specifies the number of tile groups within atlas with id equal to atlas_id than contain samples with the view with the index equal to view index. When num_tile_groups equals to 0, then all tile groups belonging to atlas with id equal to atlas_id contain samples with view with the index equal to view_index tile_groups_address specifies the address of tile group within atlas with id equal to atlas id that contains samples with the view with the index equal to view index.

In another embodiment, in order to enable a view-frustum culling, i.e. culling objects outside of the user's current view of the scene, a sample group is defined. It provides a mapping of an atlas to an object. The object may include visibility cone information that can be used for culling. Due to the use of a sample group (or one or more sample groups), the mapping can change along the timeline of the volumetric video.

Object Information Sample Group Entry
Definition
Box Type: 'vpoi'
Container: Sample Group Description Box ('sgpd')
Mandatory: No
Quantity: Zero or more A view information sample group entry identifies which views are carried by samples. The grouping_type_parameter is not defined for the SampleToGroupBox with grouping type 'vpoi'. A view information sample group entry may also provide information in which other tracks samples with data containing the same view is carried.
Syntax

```
aligned(8) class ObjectInformationSampleGroupEntry extends
VisualSampleGroupEntry ('vpoi', version = 0, flags) {
    unsigned int(8) group_id;
    unsigned int(8) num_objects;
    for(i=0; i < num_objects; i++) {
        unsigned int(8) object index;
        unsigned int(8) num_atlases;
        for(j=0; j < num_atlases; j++) {
            unsigned int(32) atlas_id;
            unsigned int(32) num_tile_groups
            for(k=0; k < num_tile_groups; k++) {
                unsigned int (32) tile_groups_address;
            }
        }
    }
}
```

Semantics group_id specifies the unique identifier of the group.

num_objects specifies the number of objects carried by samples.

object_index specifies the index of an object carried by samples. The index is mapped to object index soi_object_idx in the active scene_object_information SEI message.

num_atlases specifies the number of atlases, other than the atlas contained in the track the sample group belongs to, that contain samples with the object with the index equal to object_index.

atlas_id specifies the id of an atlas that contains samples with the object with the index equal to object_index.

num_tile_groups specifies the number of tile groups within atlas with id equal to atlas_id than contain samples with the object with the index equal to object index. When num_tile_groups equals to 0, then all tile groups belonging to atlas with id equal to atlas_id contain samples with object with the index equal to object_index.

tile_groups_address specifies the address of tile group within atlas with id equal to atlas_id that contains samples with the object with the index equal to object_index.

In another embodiment, V-PCC parameter tracks contain adaptation_params_rbsp with additional signaling of atlas map per view as described in 1. 'View-to-atlas mapping metadata'. Each atlas is carried by one track, and based on adaptation_params_rbsp an application informs a file parser which atlases are required at a given time. The file parser maps atlas ids to track ids based on the atlas id in VPCCUnitHeaderBox that is contained in the VPCCSampleEntry of every V-PCC track carrying atlas data.

In another embodiment, V-PCC parameter tracks contain scene object information with additional signaling of atlas map per view as described in 1. 'View-to-atlas mapping metadata'. Each atlas is carried by one track, and based on scene_object_information an application informs a file parser which atlases are required at a given time. The file parser maps atlas ids to track ids based on the atlas_id in VPCCUnitHeaderBox that is contained in the VPCCSampleEntry of every V-PCC track carrying atlas data.

In another embodiment, a V-PCC bitstream containing a coded point cloud sequence (CPCS) that is composed of VPCC units carrying V-PCC parameter set (VPS) data, one atlas bitstream, and more than one 2D video encoded bitstreams is stored in ISOBMFF. An example of such V-PCC bitstream is one carrying volumetric video compressed according to V-PCC defined in ISO/IEC 23090-5.

One atlas bitstream is encapsulated in a separate V-PCC track. One of those tracks is interpreted as a tile parameter track that is part of the V-PCC bitstream, while other tracks are interpreted as tile tracks that are part of the V-PCC bitstream. Each tile track carries samples containing one or more atlas_tile_group_layer_rbsp structures.

A tile track is part of the V-PCC bitstream when it contains a 'mtpt' track reference to another V-PCC track and has a sample entry type equal to 'vpt1' or 'vptg'. This referenced track is referred to as the tile parameter track of the V-PCC bitstream and could have a sample entry type equal to 'vptP'.

A tile parameter track does not include ACL NAL units. For any atlas access unit carried by samples in a tile parameter track and a number of tile tracks, all the atlas NAL units that apply to the entire atlas access unit are carried in the tile parameter track. These atlas NAL units include (but are not limited to) adaptation_params_rbsp, atlas_sequence_parameters_rbsp, atlas_frame_rbsp, SEI messages as well as EOB and EOS NAL units, when present.

Each of the tile tracks may contain ObjectInformationSampleGroupEntry or ViewInformationSampleGroupEntry as defined in the previous embodiments.

As described herein, while components are extracted, the proposed signaling does not enable extraction of components arbitrarily, and the components always need to relate to the same atlas. The extraction happens for one or more sets of components belonging to the same atlas, rather than just extracting a component. Belonging in the same atlas means that the components share the same atlas id. The component can be atlas data or video coded occupancy, attribute or geometry data. Thus the embodiments described herein do not necessarily relate to extracting or culling single components, but sets of components that represent a partial portion of the scene. With the atlas to view and atlas to object mapping, entire atlases may be culled.

Figure 9:
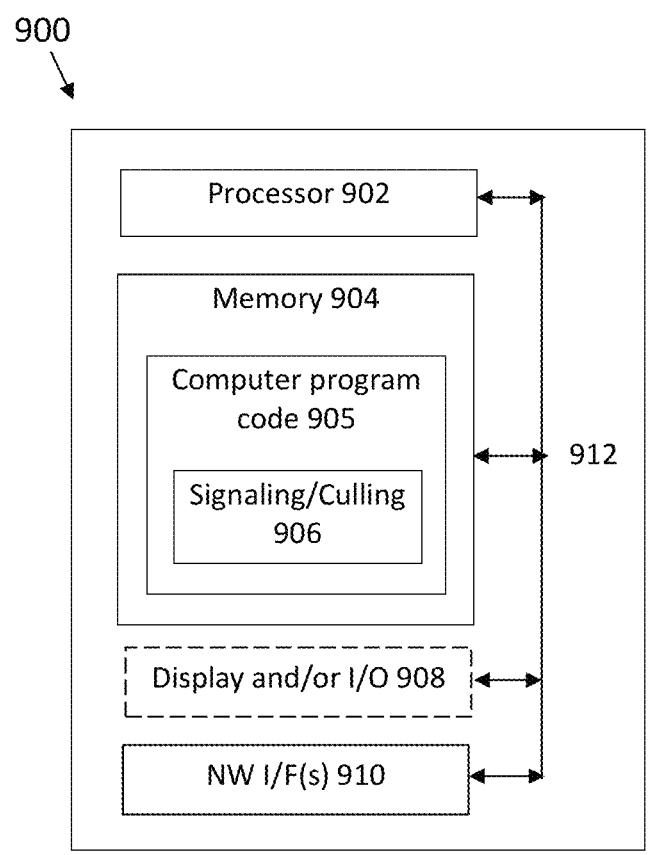
FIG. 9 is an example apparatus, which may be implemented in hardware, configured to implement efficient culling of volumetric video atlas bitstreams, based on the examples described herein.

FIG. 9 is an example apparatus 900, which may be implemented in hardware, configured to implement efficient culling of volumetric video atlas bitstreams based on the example embodiments described herein. The apparatus 900 comprises a processor 902, at least one non-transitory memory 904 including computer program code 905, wherein the at least one memory 904 and the computer program code 905 are configured to, with the at least one processor 902, cause the apparatus to implement a process, component, module, or function (collectively 906) to implement efficient culling of volumetric video atlas bitstreams based on the example embodiments described herein. The apparatus 900 optionally includes a display and/or I/O interface 908 that may be used to display a culled bitstream. The apparatus 900 also includes one or more network (NW) interfaces (I/F(s)) 910. The NW I/F(s) 910 may be wired and/or wireless and communicate over a channel or the Internet/other network(s) via any communication technique. The NW I/F(s) 910 may comprise one or more transmitters and one or more receivers. The N/W I/F(s) 910 may comprise standard well-known components such as an amplifier, filter, frequency-converter, (de)modulator, and encoder/decoder circuitry(ies) and one or more antennas. In some examples, the processor 902 is configured to implement item 906 without use of memory 904.

The apparatus 900 may be a remote, virtual or cloud apparatus. The apparatus 900 may be either a writer or a reader (e.g. parser), or both a writer and a reader (e.g. parser). The apparatus 900 may be either a coder or a decoder, or both a coder and a decoder. The apparatus 900 may be a user equipment (UE), a head mounted display (HMD), or any other fixed or mobile device.

The memory 904 may be implemented using any suitable data storage technology, such as semiconductor based memory devices, flash memory, magnetic memory devices and systems, optical memory devices and systems, fixed memory and removable memory. The memory 904 may comprise a database for storing data. Interface 912 enables data communication between the various items of apparatus 900, as shown in FIG. 9. Interface 912 may be one or more buses, or interface 912 may be one or more software interfaces configured to pass data between the items of apparatus 900. For example, the interface 912 may be one or more buses such as address, data, or control buses, and may include any interconnection mechanism, such as a series of lines on a motherboard or integrated circuit, fiber optics or other optical communication equipment, and the like. The apparatus 900 need not comprise each of the features mentioned, or may comprise other features as well.

Figure 10:
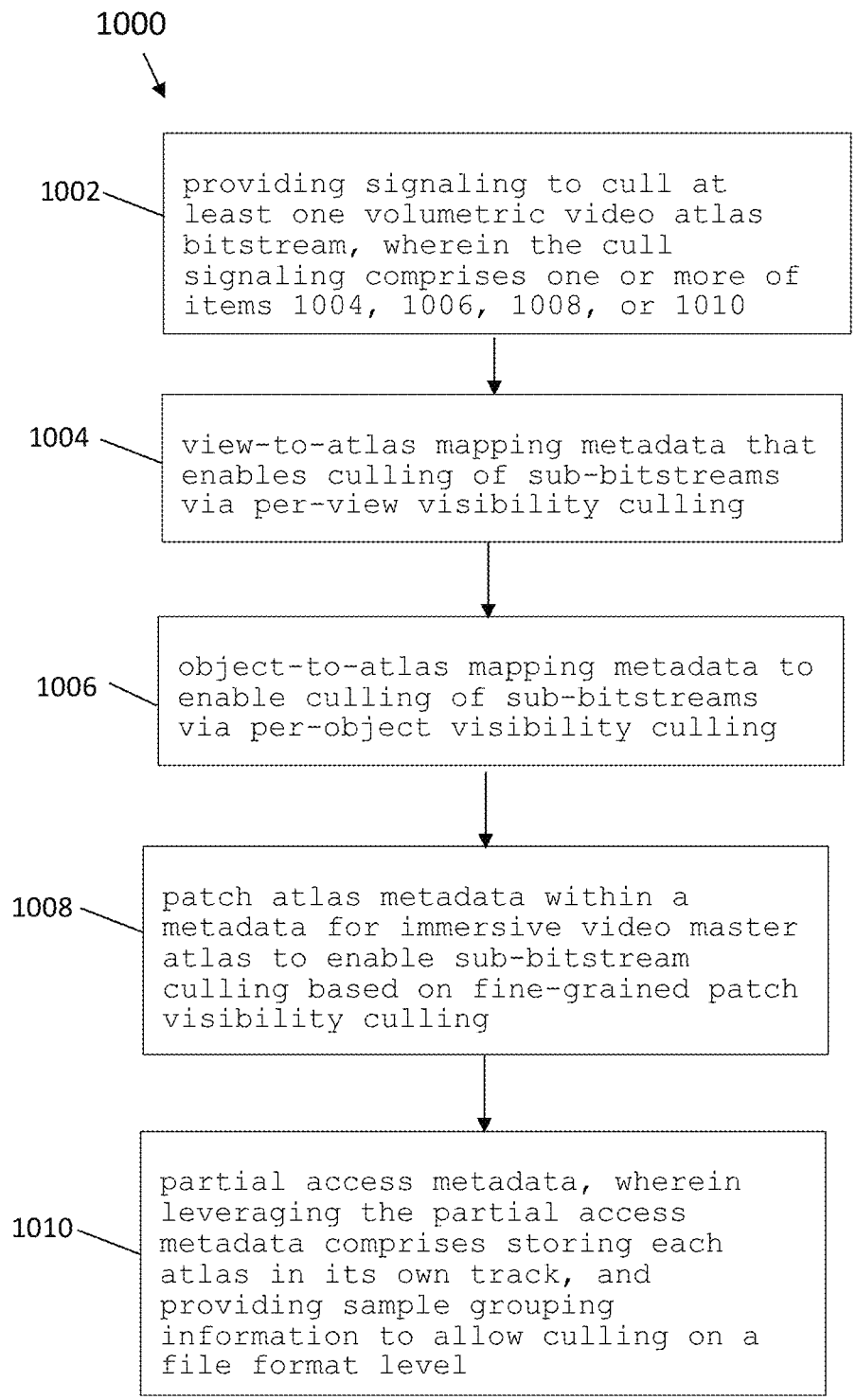
FIG. 10 is an example method to implement efficient culling of volumetric video atlas bitstreams, based on the examples described herein.

FIG. 10 is an example method 1000 for implementing efficient culling of volumetric video atlas bitstreams based on the example embodiments described herein. At 1002, the method includes providing signaling to cull at least one volumetric video atlas bitstream, wherein the cull signaling comprises one or more of items 1004, 1006, 1008, or 1010. At 1004, the method includes wherein the cull signaling comprises view-to-atlas mapping metadata that enables culling of sub-bitstreams via per-view visibility culling. At 1006, the method includes wherein the cull signaling comprises object-to-atlas mapping metadata to enable culling of sub-bitstreams via per-object visibility culling. At 1008, the method includes wherein the cull signaling comprises patch atlas metadata within a metadata for immersive video master atlas to enable sub-bitstream culling based on fine-grained patch visibility culling. At 1010, the method includes wherein the cull signaling comprises partial access metadata, wherein leveraging the partial access metadata comprises storing each atlas in its own track, and providing sample grouping information to allow culling on a file format level. Method 1000 may be implemented by apparatus 900.

Figure 11:
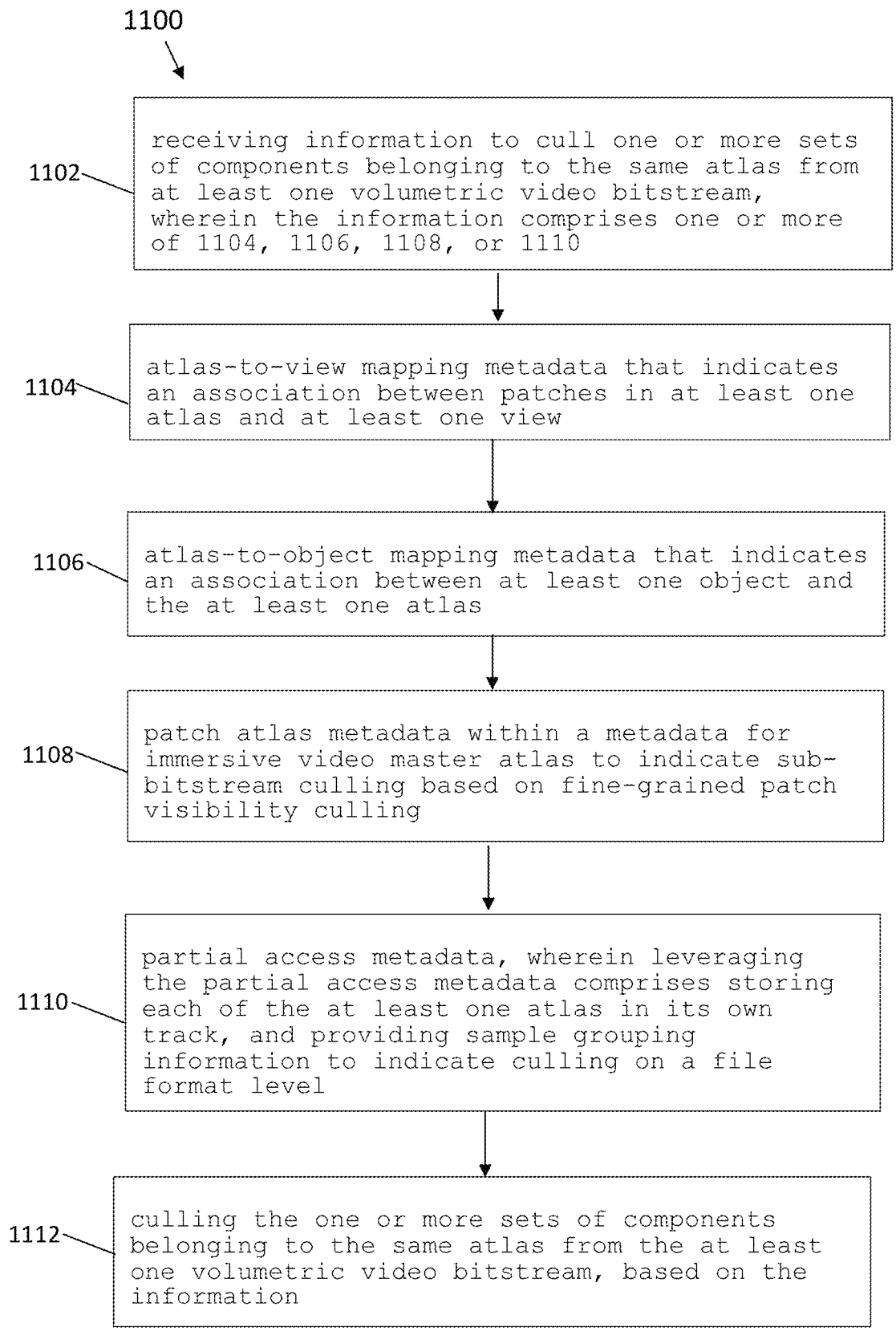
FIG. 11 is another example method to implement efficient culling of volumetric video atlas bitstreams, based on the examples described herein.

FIG. 11 is another example method 1100 for implementing efficient culling of volumetric video atlas bitstreams based on the example embodiments described herein. At 1102, the method includes receiving information to cull one or more sets of components belonging to the same atlas from at least one volumetric video bitstream, wherein the information comprises one or more of 1104, 1106, 1108, or 1110. At 1104, the method includes wherein the information comprises atlas-to-view mapping metadata that indicates an association between patches in at least one atlas and at least one view. At 1106, the method includes wherein the information comprises atlas-to-object mapping metadata that indicates an association between at least one object and the at least one atlas. At 1108, the method includes wherein the information comprises patch atlas metadata within a metadata for immersive video master atlas to indicate sub-bitstream culling based on fine-grained patch visibility culling. At 1110, the method includes wherein the information comprises partial access metadata, wherein leveraging the partial access metadata comprises storing each of the at least one atlas in its own track, and providing sample grouping information to indicate culling on a file format level. At 1112, the method includes culling the one or more sets of components belonging to the same atlas from the at least one volumetric video bitstream, based on the information. Method 1100 may be implemented by a decoder apparatus, or by apparatus 900.

Figure 12:
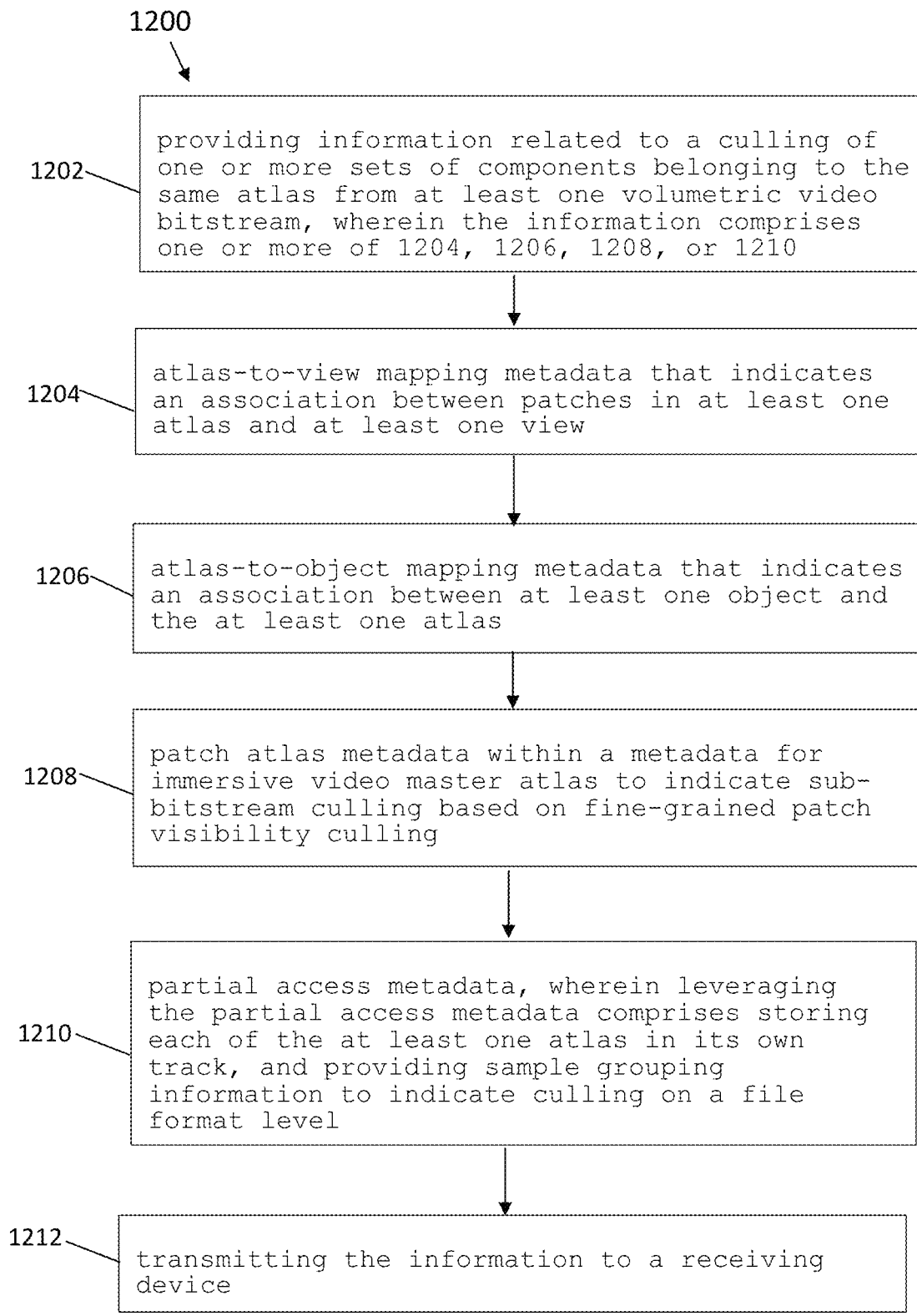
FIG. 12 is another example method to implement efficient culling of volumetric video atlas bitstreams, based on the examples described herein.

FIG. 12 is another example method 1200 for implementing efficient culling of volumetric video atlas bitstreams based on the example embodiments described herein. At 1202, the method includes providing information related to a culling of one or more sets of components belonging to the same atlas from at least one volumetric video bitstream, wherein the information comprises one or more of 1204, 1206, 1208, or 1210. At 1204, the method includes wherein the information comprises atlas-to-view mapping metadata that indicates an association between patches in at least one atlas and at least one view. At 1206, the method includes wherein the information comprises atlas-to-object mapping metadata that indicates an association between at least one object and the at least one atlas. At 1208, the method includes wherein the information comprises patch atlas metadata within a metadata for immersive video master atlas to indicate sub-bitstream culling based on fine-grained patch visibility culling. At 1210, the method includes wherein the information comprises partial access metadata, wherein leveraging the partial access metadata comprises storing each of the at least one atlas in its own track, and providing sample grouping information to indicate culling on a file format level. At 1212, the method includes transmitting the information to a receiving device. Method 1200 may be implemented by an encoder apparatus, or by apparatus 900.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. Circuitry may also be used to mean a function or a process, such as one implemented by an encoder or decoder, or a codec.

Based on the examples referred to herein, an example apparatus may be provided that includes at least one processor; and at least one non-transitory memory including computer program code; wherein the at least one memory and the computer program code are configured to, with the at least one processor, cause the apparatus at least to perform: provide signaling to cull at least one volumetric video atlas bitstream, wherein the cull signaling comprises one or more of: view-to-atlas mapping metadata that enables culling of sub-bitstreams via per-view visibility culling; object-to-atlas mapping metadata to enable culling of sub-bitstreams via per-object visibility culling; patch atlas metadata within a metadata for immersive video master atlas to enable sub-bitstream culling based on fine-grained patch visibility culling; or partial access metadata, wherein leveraging the partial access metadata comprises storing each atlas in its own track, and providing sample grouping information to allow culling on a file format level.

The apparatus may further include wherein the at least one memory and the computer program code are further configured to, with the at least one processor, cause the apparatus at least to perform: cull at least one volumetric video atlas using the provided signaling; and render a view frustum corresponding to the non-culled volumetric video atlas bitstreams.

The apparatus may further include wherein the view-to-atlas mapping metadata is a bitmask of N bits, where N is a number of atlas sub-bitstreams.

The apparatus may further include wherein the bitmask is embedded in a view parameter substructure of an adaptation parameter structure.

The apparatus may further include wherein the view-to-atlas mapping metadata comprises a temporal update of an atlas map together with a camera extrinsic in a view parameter extrinsic substructure of an adaptation parameter structure.

The apparatus may further include wherein the view-to-atlas mapping metadata comprises a temporal update as an atlas map update substructure of an adaptation parameter structure.

The apparatus may further include wherein the at least one volumetric video atlas is culled after the volumetric video atlas has been encoded such that patches belonging to a certain view are grouped together in a single atlas.

The apparatus may further include wherein the object-to-atlas mapping metadata comprises an atlas map element to inform a renderer in what other atlases an object is present, wherein the atlas map element extends a patch information supplemental enhancement information message.

The apparatus may further include wherein the object-to-atlas mapping metadata comprises an extension to a scene object information supplemental enhancement information message to provide a mapping of object identifiers (IDs) to atlases.

The apparatus may further include wherein the extension is implemented as a bitmask and indicates, for every object, an atlas that contains patches referring back to the respective object.

The apparatus may further include wherein the at least one memory and the computer program code are further configured to, with the at least one processor, cause the apparatus at least to perform, to implement the fine-grained patch visibility culling, either: loop over all patch atlases, detect potentially visible patches, mark an atlas as required once a first potentially visible patch is found, and move to a next patch atlas; or perform the per-view visibility culling, process patches referring to a potentially visible view, and mark relevant atlases as required.

The apparatus may further include wherein when the at least one volumetric video atlas bitstream contains a coded point cloud sequence (CPCS) that is composed of units carrying V-PCC parameter set (VPS) data, more than one atlas bitstream, and more than one 2D video encoded bitstreams, the at least one volumetric video atlas bitstream is stored in ISOBMFF.

The apparatus may further include wherein the at least one memory and the computer program code are further configured to, with the at least one processor, cause the apparatus at least to perform: define a sample group entry to provide a mapping of an atlas to a view to enable a view-frustum culling.

The apparatus may further include wherein the at least one memory and the computer program code are further configured to, with the at least one processor, cause the apparatus at least to perform: define a sample group entry to provide a mapping of an atlas to an object to enable a view-frustum culling.

The apparatus may further include wherein the at least one memory and the computer program code are further configured to, with the at least one processor, cause the apparatus at least to perform: inform a file parser which atlases are required at a given time with signaling within an adaptation parameters structure.

The apparatus may further include wherein the at least one memory and the computer program code are further configured to, with the at least one processor, cause the apparatus at least to perform: inform a file parser which atlases are required at a given time with signaling within a supplemental enhancement information scene object information message.

The apparatus may further include wherein when the at least one volumetric video atlas bitstream contains a coded point cloud sequence (CPCS) that is composed of units carrying V-PCC parameter set (VPS) data, one atlas bitstream, and more than one 2D video encoded bitstreams, the at least one volumetric video atlas bitstream is stored in ISOBMFF.

The apparatus may further include wherein the at least one volumetric video atlas is culled without having to access every atlas metadata bitstream.

Based on the examples referred to herein, an example non-transitory program storage device readable by a machine, tangibly embodying a program of instructions executable by the machine for performing operations may be provided, the operations comprising: providing signaling to cull at least one volumetric video atlas bitstream, wherein the cull signaling comprises one or more of: view-to-atlas mapping metadata that enables culling of sub-bitstreams via per-view visibility culling; object-to-atlas mapping metadata to enable culling of sub-bitstreams via per-object visibility culling; patch atlas metadata within a metadata for immersive video master atlas to enable sub-bitstream culling based on fine-grained patch visibility culling; or partial access metadata, wherein leveraging the partial access metadata comprises storing each atlas in its own track, and providing sample grouping information to allow culling on a file format level.

Based on the examples referred to herein, an example method may be provided that includes providing signaling to cull at least one volumetric video atlas bitstream, wherein the cull signaling comprises one or more of: view-to-atlas mapping metadata that enables culling of sub-bitstreams via per-view visibility culling; object-to-atlas mapping metadata to enable culling of sub-bitstreams via per-object visibility culling; patch atlas metadata within a metadata for immersive video master atlas to enable sub-bitstream culling based on fine-grained patch visibility culling; or partial access metadata, wherein leveraging the partial access metadata comprises storing each atlas in its own track, and providing sample grouping information to allow culling on a file format level.

Based on the examples referred to herein, an example apparatus may be provided that includes means for providing signaling to cull at least one volumetric video atlas bitstream, wherein the cull signaling comprises one or more of: view-to-atlas mapping metadata that enables culling of sub-bitstreams via per-view visibility culling; object-to-atlas mapping metadata to enable culling of sub-bitstreams via per-object visibility culling; patch atlas metadata within a metadata for immersive video master atlas to enable sub-bitstream culling based on fine-grained patch visibility culling; or partial access metadata, wherein leveraging the partial access metadata comprises storing each atlas in its own track, and providing sample grouping information to allow culling on a file format level.

An example apparatus includes means for receiving information to cull one or more sets of components belonging to the same atlas from at least one volumetric video bitstream;

wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and means for culling the one or more sets of components belonging to the same atlas from the at least one volumetric video bitstream, based on the information.

Other aspects of the apparatus may include the following. The apparatus may further include means for rendering a view frustum corresponding to one or more sets of components of the volumetric video bitstream that have not been culled. The atlas-to-view mapping metadata may be received as a supplemental enhancement information message comprising a payload size and bitmask indicating mapping information between views and atlases. The atlas-to-view mapping metadata may specify a persistence of a previous atlas view supplemental enhancement information message. The persistence may be specified using a flag, wherein the flag being equal to zero specifies that the atlas view supplemental enhancement information message applies to a current atlas frame; and the flag being equal to one specifies that the atlas view supplemental enhancement information message applies to the current atlas frame and persists for subsequent atlas frames in decoding order until meeting at least one condition comprising a beginning of a new sequence, an ending of the at least one volumetric video bitstream, or an atlas frame having a supplemental enhancement information message present. The at least one volumetric video bitstream may be culled after the at least one volumetric video bitstream has been encoded such that patches belonging to a certain view are grouped together in a single atlas. The at least one volumetric video bitstream may comprise one or more coded visual volumetric video-based coding sequences, where the one or more coded visual volumetric video-based coding sequences comprise at least one video based point cloud coding parameter set, and the one or more coded visual volumetric video-based coding sequences comprise at least one visual volumetric video-based coding sub-bitstream associated with a visual volumetric video-based coding component that starts with a corresponding intra random access picture sub-bitstream unit. The apparatus may further include means for interpreting a sample group entry that provides a mapping of the at least one atlas to the at least one object that configures a view-frustum culling. The information may signal partial access utilizing a visual volumetric video-based coding supplemental enhancement information message family. The volumetric video bitstream may be a set of visual volumetric video-based coding sub-bitstreams, which belong to the same atlas. The atlas-to-view mapping metadata or the atlas-to-object mapping metadata may be received together with a camera extrinsic in a view parameter extrinsic substructure of an adaptation parameter structure. The one or more sets of components belonging to the same atlas may share an atlas identifier. A component of the one or more sets of components may be atlas data, or video coded occupancy, attribute or geometry data, and the one or more sets of components may represent a partial portion of a scene. The apparatus may further include means for culling an entire atlas using the atlas-to-view mapping metadata and the atlas-to-object mapping metadata. The atlas-to-object mapping metadata may be received as a supplemental enhancement information message, and may indicate a value of the at least one object given an atlas identifier and an index of the at least one object. The atlas-to-object mapping metadata may indicate, for the at least one object, an atlas that contains patches referring back to the at least one object. The atlas-to-object mapping metadata may be received as a supplemental enhancement information message comprising a payload size and bitmask indicating mapping information between objects and atlases. The atlas-to-object mapping metadata may specify a persistence of a previous atlas object supplemental enhancement information message. The persistence may be specified using a flag, where the flag being equal to zero specifies that the atlas object supplemental enhancement information message applies to a current atlas frame, and the flag being equal to one specifies that the atlas object supplemental enhancement information message applies to the current atlas frame and persists for subsequence atlas frames in decoding order until meeting at least one condition comprising a beginning of a new sequence, an ending of the at least one volumetric video bitstream, or an atlas frame having a supplemental enhancement information message present. The at least one volumetric video bitstream may be culled after the at least one volumetric video bitstream has been encoded such that patches belonging to a certain object are grouped together in a single atlas.

An example apparatus includes means for providing information related to a culling of one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and means for transmitting the information to a receiving device.

Other aspects of the apparatus may include the following. The information may be provided using at least one sample group entry object. The atlas-to-view mapping metadata may be provided as a supplemental enhancement information message comprising a payload size and bitmask indicating mapping information between views and atlases. The atlas-to-view mapping metadata may specify a persistence of a previous atlas view supplemental enhancement information message. The persistence may be specified using a flag, where the flag being equal to zero specifies that the atlas view supplemental enhancement information message applies to a current atlas frame, and the flag being equal to one specifies that the atlas view supplemental enhancement information message applies to the current atlas frame and persists for subsequent atlas frames in decoding order until meeting at least one condition comprising a beginning of a new sequence, an ending of the at least one volumetric video bitstream, or an atlas frame having a supplemental enhancement information message present. The apparatus may further include means for encoding the at least one volumetric video bitstream such that patches belonging to a certain view are grouped together in a single atlas. The at least one volumetric video bitstream may comprise one or more coded visual volumetric video-based coding sequences, where the one or more coded visual volumetric video-based coding sequences comprise at least one video based point cloud coding parameter set, and the one or more coded visual volumetric video-based coding sequences comprise at least one visual volumetric video-based coding sub-bitstream associated with a visual volumetric video-based coding component that starts with a corresponding intra random access picture sub-bitstream unit. The apparatus may further include means for defining a sample group entry that provides a mapping of the at least one atlas to the at least one object that configures a view-frustum culling. The information may signals partial access utilizing a visual volumetric video-based coding supplemental enhancement information message family. The volumetric video bitstream may be a set of visual volumetric video-based coding sub-bitstreams, which belong to the same atlas. The atlas-to-view mapping metadata or the atlas-to-object mapping metadata may be provided together with a camera extrinsic in a view parameter extrinsic substructure of an adaptation parameter structure. The one or more sets of components belonging to the same atlas may share an atlas identifier. A component of the one or more sets of components may be atlas data, or video coded occupancy, attribute or geometry data, and the one or more sets of components may represent a partial portion of a scene. An entire atlas may be culled using the atlas-to-view mapping metadata and the atlas-to-object mapping metadata. The atlas-to-object mapping metadata may be provided as a supplemental enhancement information message, and may indicate a value of the at least one object given an atlas identifier and an index of the at least one object. The atlas-to-object mapping metadata may indicate, for the at least one object, an atlas that contains patches referring back to the at least one object. The atlas-to-object mapping metadata may be provided as a supplemental enhancement information message comprising a payload size and bitmask indicating mapping information between objects and atlases. The atlas-to-object mapping metadata may specify a persistence of a previous atlas object supplemental enhancement information message. The persistence may be specified using a flag, where the flag being equal to zero specifies that the atlas object supplemental enhancement information message applies to a current atlas frame, and the flag being equal to one specifies that the atlas object supplemental enhancement information message applies to the current atlas frame and persists for subsequence atlas frames in decoding order until meeting at least one condition comprising a beginning of a new sequence, an ending of the at least one volumetric video bitstream, or an atlas frame having a supplemental enhancement information message present. The apparatus may further include means for encoding the at least one volumetric video bitstream such that patches belonging to a certain object are grouped together in a single atlas.

An example apparatus includes at least one processor; and at least one non-transitory memory including computer program code; wherein the at least one memory and the computer program code are configured to, with the at least one processor, cause the apparatus at least to: receive information to cull one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and cull the one or more sets of components belonging to the same atlas from the at least one volumetric video bitstream, based on the information.

Other aspects of the apparatus may include the following. The at least one memory and the computer program code may be further configured to, with the at least one processor, cause the apparatus at least to: render a view frustum corresponding to one or more sets of components of the volumetric video bitstream that have not been culled. The atlas-to-view mapping metadata may be received as a supplemental enhancement information message comprising a payload size and bitmask indicating mapping information between views and atlases. The atlas-to-view mapping metadata may specify a persistence of a previous atlas view supplemental enhancement information message. The persistence may be specified using a flag, where the flag being equal to zero specifies that the atlas view supplemental enhancement information message applies to a current atlas frame, and the flag being equal to one specifies that the atlas view supplemental enhancement information message applies to the current atlas frame and persists for subsequent atlas frames in decoding order until meeting at least one condition comprising a beginning of a new sequence, an ending of the at least one volumetric video bitstream, or an atlas frame having a supplemental enhancement information message present. The at least one volumetric video bitstream may be culled after the at least one volumetric video bitstream has been encoded such that patches belonging to a certain view are grouped together in a single atlas. The at least one volumetric video bitstream may comprise one or more coded visual volumetric video-based coding sequences, where the one or more coded visual volumetric video-based coding sequences comprise at least one video based point cloud coding parameter set, and the one or more coded visual volumetric video-based coding sequences comprise at least one visual volumetric video-based coding sub-bitstream associated with a visual volumetric video-based coding component that starts with a corresponding intra random access picture sub-bitstream unit. The at least one memory and the computer program code may be further configured to, with the at least one processor, cause the apparatus at least to: interpret a sample group entry that provides a mapping of the at least one atlas to the at least one object that configures a view-frustum culling. The information may signal partial access utilizing a visual volumetric video-based coding supplemental enhancement information message family. The volumetric video bitstream may be a set of visual volumetric video-based coding sub-bitstreams, which belong to the same atlas. The atlas-to-view mapping metadata or the atlas-to-object mapping metadata may be received together with a camera extrinsic in a view parameter extrinsic substructure of an adaptation parameter structure. The one or more sets of components belonging to the same atlas may share an atlas identifier. A component of the one or more sets of components may be atlas data, or video coded occupancy, attribute or geometry data, and the one or more sets of components may represent a partial portion of a scene. The at least one memory and the computer program code may be further configured to, with the at least one processor, cause the apparatus at least to: cull an entire atlas using the atlas-to-view mapping metadata and the atlas-to-object mapping metadata. The atlas-to-object mapping metadata may be received as a supplemental enhancement information message, and indicate a value of the at least one object given an atlas identifier and an index of the at least one object. The atlas-to-object mapping metadata may indicate, for the at least one object, an atlas that contains patches referring back to the at least one object. The atlas-to-object mapping metadata may be received as a supplemental enhancement information message comprising a payload size and bitmask indicating mapping information between objects and atlases. The atlas-to-object mapping metadata may specify a persistence of a previous atlas object supplemental enhancement information message. The persistence may be specified using a flag, where the flag being equal to zero specifies that the atlas object supplemental enhancement information message applies to a current atlas frame, and the flag being equal to one specifies that the atlas object supplemental enhancement information message applies to the current atlas frame and persists for subsequence atlas frames in decoding order until meeting at least one condition comprising a beginning of a new sequence, an ending of the at least one volumetric video bitstream, or an atlas frame having a supplemental enhancement information message present. The at least one volumetric video bitstream may be culled after the at least one volumetric video bitstream has been encoded such that patches belonging to a certain object are grouped together in a single atlas.

Other aspects of the apparatus may include the following. The at least one memory and the computer program code may be further configured to, with the at least one processor, cause the apparatus at least to: render a view frustum corresponding to one or more sets of components of the volumetric video bitstream that have not been culled; and wherein the at least one volumetric video bitstream is culled after the at least one volumetric video bitstream has been encoded such that patches belonging to a certain view are grouped together in a single atlas. The atlas-to-view mapping metadata may be received as a supplemental enhancement information message comprising a payload size and bitmask indicating mapping information between views and atlases, the atlas-to-view mapping metadata may specify a persistence of a previous atlas view supplemental enhancement information message, the persistence may be specified using a flag, wherein the flag being equal to zero specifies that the atlas view supplemental enhancement information message applies to a current atlas frame, and wherein the flag being equal to one specifies that the atlas view supplemental enhancement information message applies to the current atlas frame and persists for subsequent atlas frames in decoding order until meeting at least one condition comprising a beginning of a new sequence, an ending of the at least one volumetric video bitstream, or an atlas frame having a supplemental enhancement information message present. The at least one volumetric video bitstream may comprises one or more coded visual volumetric video-based coding sequences, where the one or more coded visual volumetric video-based coding sequences comprise at least one video based point cloud coding parameter set, and where the one or more coded visual volumetric video-based coding sequences comprise at least one visual volumetric video-based coding sub-bitstream associated with a visual volumetric video-based coding component that starts with a corresponding intra random access picture sub-bitstream unit. The at least one memory and the computer program code may be further configured to, with the at least one processor, cause the apparatus at least to: interpret a sample group entry that provides a mapping of the at least one atlas to the at least one object that configures a view-frustum culling. The information may signal partial access utilizing a visual volumetric video-based coding supplemental enhancement information message family. The volumetric video bitstream may be a set of visual volumetric video-based coding sub-bitstreams, which belong to the same atlas, the atlas-to-view mapping metadata or the atlas-to-object mapping metadata may be received together with a camera extrinsic in a view parameter extrinsic substructure of an adaptation parameter structure, the one or more sets of components belonging to the same atlas may share an atlas identifier, or a component of the one or more sets of components may be atlas data, or video coded occupancy, attribute or geometry data, and the one or more sets of components may represent a partial portion of a scene. The at least one memory and the computer program code may be further configured to, with the at least one processor, cause the apparatus at least to: cull an entire atlas using the atlas-to-view mapping metadata and the atlas-to-object mapping metadata, wherein the at least one volumetric video bitstream is culled after the at least one volumetric video bitstream has been encoded such that patches belonging to a certain object are grouped together in a single atlas. The atlas-to-object mapping metadata may be received as a supplemental enhancement information message, and indicate a value of the at least one object given an atlas identifier and an index of the at least one object, wherein the atlas-to-object mapping metadata indicates, for the at least one object, an atlas that contains patches referring back to the at least one object, wherein the atlas-to-object mapping metadata is received as a supplemental enhancement information message comprising a payload size and bitmask indicating mapping information between objects and atlases, wherein the atlas-to-object mapping metadata specifies a persistence of a previous atlas object supplemental enhancement information message, wherein the persistence is specified using a flag, wherein the flag being equal to zero specifies that the atlas object supplemental enhancement information message applies to a current atlas frame, and wherein the flag being equal to one specifies that the atlas object supplemental enhancement information message applies to the current atlas frame and persists for subsequence atlas frames in decoding order until meeting at least one condition comprising a beginning of a new sequence, an ending of the at least one volumetric video bitstream, or an atlas frame having a supplemental enhancement information message present.

An example apparatus includes at least one processor; and at least one non-transitory memory including computer program code; wherein the at least one memory and the computer program code are configured to, with the at least one processor, cause the apparatus at least to: provide information related to a culling of one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and transmit the information to a receiving device.

Other aspects of the apparatus may include the following. The information may be provided using at least one sample group entry object. The atlas-to-view mapping metadata may be provided as a supplemental enhancement information message comprising a payload size and bitmask indicating mapping information between views and atlases. The atlas-to-view mapping metadata may specify a persistence of a previous atlas view supplemental enhancement information message. The persistence may be specified using a flag, where the flag being equal to zero specifies that the atlas view supplemental enhancement information message applies to a current atlas frame, and the flag being equal to one specifies that the atlas view supplemental enhancement information message applies to the current atlas frame and persists for subsequent atlas frames in decoding order until meeting at least one condition comprising a beginning of a new sequence, an ending of the at least one volumetric video bitstream, or an atlas frame having a supplemental enhancement information message present. The at least one memory and the computer program code may be further configured to, with the at least one processor, cause the apparatus at least to: encode the at least one volumetric video bitstream such that patches belonging to a certain view are grouped together in a single atlas. The at least one volumetric video bitstream may comprise one or more coded visual volumetric video-based coding sequences, where the one or more coded visual volumetric video-based coding sequences comprise at least one video based point cloud coding parameter set, and the one or more coded visual volumetric video-based coding sequences comprise at least one visual volumetric video-based coding sub-bitstream associated with a visual volumetric video-based coding component that starts with a corresponding intra random access picture sub-bitstream unit. The at least one memory and the computer program code may be further configured to, with the at least one processor, cause the apparatus at least to: define a sample group entry that provides a mapping of the at least one atlas to the at least one object that configures a view-frustum culling. The information may signal partial access utilizing a visual volumetric video-based coding supplemental enhancement information message family. The volumetric video bitstream may be a set of visual volumetric video-based coding sub-bitstreams, which belong to the same atlas. The atlas-to-view mapping metadata or the atlas-to-object mapping metadata may be provided together with a camera extrinsic in a view parameter extrinsic substructure of an adaptation parameter structure. The one or more sets of components belonging to the same atlas may share an atlas identifier. A component of the one or more sets of components may be atlas data, or video coded occupancy, attribute or geometry data, and the one or more sets of components may represent a partial portion of a scene. An entire atlas may be culled using the atlas-to-view mapping metadata and the atlas-to-object mapping metadata. The atlas-to-object mapping metadata may be provided as a supplemental enhancement information message, and indicate a value of the at least one object given an atlas identifier and an index of the at least one object. The atlas-to-object mapping metadata may indicate, for the at least one object, an atlas that contains patches referring back to the at least one object. The atlas-to-object mapping metadata may be provided as a supplemental enhancement information message comprising a payload size and bitmask indicating mapping information between objects and atlases. The atlas-to-object mapping metadata may specify a persistence of a previous atlas object supplemental enhancement information message. The persistence may be specified using a flag, where the flag being equal to zero specifies that the atlas object supplemental enhancement information message applies to a current atlas frame, and the flag being equal to one specifies that the atlas object supplemental enhancement information message applies to the current atlas frame and persists for subsequence atlas frames in decoding order until meeting at least one condition comprising a beginning of a new sequence, an ending of the at least one volumetric video bitstream, or an atlas frame having a supplemental enhancement information message present. The at least one memory and the computer program code may be further configured to, with the at least one processor, cause the apparatus at least to: encode the at least one volumetric video bitstream such that patches belonging to a certain object are grouped together in a single atlas.

Other aspects of the apparatus may include the following. The information may be provided using at least one sample group entry object, wherein the at least one memory and the computer program code are further configured to, with the at least one processor, cause the apparatus at least to: encode the at least one volumetric video bitstream such that patches belonging to a certain object are grouped together in a single atlas. The atlas-to-view mapping metadata may be provided as a supplemental enhancement information message comprising a payload size and bitmask indicating mapping information between views and atlases, wherein the atlas-to-view mapping metadata specifies a persistence of a previous atlas view supplemental enhancement information message, wherein the persistence is specified using a flag, wherein the flag being equal to zero specifies that the atlas view supplemental enhancement information message applies to a current atlas frame, and wherein the flag being equal to one specifies that the atlas view supplemental enhancement information message applies to the current atlas frame and persists for subsequent atlas frames in decoding order until meeting at least one condition comprising a beginning of a new sequence, an ending of the at least one volumetric video bitstream, or an atlas frame having a supplemental enhancement information message present. The at least one volumetric video bitstream may comprise one or more coded visual volumetric video-based coding sequences, where the one or more coded visual volumetric video-based coding sequences comprise at least one video based point cloud coding parameter set, and where the one or more coded visual volumetric video-based coding sequences comprise at least one visual volumetric video-based coding sub-bitstream associated with a visual volumetric video-based coding component that starts with a corresponding intra random access picture sub-bitstream unit. The at least one memory and the computer program code may be further configured to, with the at least one processor, cause the apparatus at least to: define a sample group entry that provides a mapping of the at least one atlas to the at least one object that configures a view-frustum culling. The information may signal partial access utilizing a visual volumetric video-based coding supplemental enhancement information message family. The volumetric video bitstream may be a set of visual volumetric video-based coding sub-bitstreams, which belong to the same atlas, where the atlas-to-view mapping metadata or the atlas-to-object mapping metadata is provided together with a camera extrinsic in a view parameter extrinsic substructure of an adaptation parameter structure, the one or more sets of components belonging to the same atlas share an atlas identifier, or a component of the one or more sets of components is atlas data, or video coded occupancy, attribute or geometry data, and the one or more sets of components represent a partial portion of a scene. The at least one memory and the computer program code may be further configured to, with the at least one processor, cause the apparatus at least to: encode the at least one volumetric video bitstream such that patches belonging to a certain view are grouped together in a single atlas, wherein an entire atlas is culled using the atlas-to-view mapping metadata and the atlas-to-object mapping metadata. The atlas-to-object mapping metadata may be provided as a supplemental enhancement information message, and indicate a value of the at least one object given an atlas identifier and an index of the at least one object, wherein the atlas-to-object mapping metadata indicates, for the at least one object, an atlas that contains patches referring back to the at least one object, wherein the atlas-to-object mapping metadata is provided as a supplemental enhancement information message comprising a payload size and bitmask indicating mapping information between objects and atlases, wherein the atlas-to-object mapping metadata specifies a persistence of a previous atlas object supplemental enhancement information message, wherein the persistence is specified using a flag, wherein the flag being equal to zero specifies that the atlas object supplemental enhancement information message applies to a current atlas frame, and wherein the flag being equal to one specifies that the atlas object supplemental enhancement information message applies to the current atlas frame and persists for subsequence atlas frames in decoding order until meeting at least one condition comprising a beginning of a new sequence, an ending of the at least one volumetric video bitstream, or an atlas frame having a supplemental enhancement information message present.

An example method includes receiving information to cull one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and culling the one or more sets of components belonging to the same atlas from the at least one volumetric video bitstream, based on the information.

The method may further include rendering a view frustum corresponding to one or more sets of components of the volumetric video bitstream that have not been culled.

An example method includes providing information related to a culling of one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and transmitting the information to a receiving device.

An example non-transitory program storage device readable by a machine, tangibly embodying a program of instructions executable by the machine for performing operations is provided, the operations comprising: receiving information to cull one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and culling the one or more sets of components belonging to the same atlas from the at least one volumetric video bitstream, based on the information.

An example non-transitory program storage device readable by a machine, tangibly embodying a program of instructions executable by the machine for performing operations is provided, the operations comprising: providing information related to a culling of one or more sets of components belonging to the same atlas from at least one volumetric video bitstream; wherein the information comprises one or more of: atlas-to-view mapping metadata that indicates an association between patches in at least one atlas and at least one view; atlas-to-object mapping metadata that indicates an association between at least one object and the at least one atlas; patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and transmitting the information to a receiving device.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one non-transitory memory including computer program code;
   wherein the at least one memory and the computer program code are configured to, with the at least one processor, cause the apparatus at least to:
   receive information to cull one or more sets of components belonging to the same atlas from at least one volumetric video bitstream;

wherein the information comprises one or more of:
atlas-to-view mapping metadata that indicates an association between patches in at least one atlas and at least one view;
atlas-to-object mapping metadata that indicates an association between at least one object and the at least one atlas;
patch atlas metadata within a metadata for immersive video master atlas to indicate sub-bitstream culling based on fine-grained patch visibility culling; or
partial access metadata, wherein leveraging the partial access metadata comprises storing each of the at least one atlas in its own track, and providing sample grouping information to indicate culling on a file format level; and
cull the one or more sets of components belonging to the same atlas from the at least one volumetric video bitstream, based on the information.

2. The apparatus of claim 1, wherein the at least one memory and the computer program code are further configured to, with the at least one processor, cause the apparatus at least to:
render a view frustum corresponding to one or more sets of components of the volumetric video bitstream that have not been culled; and
wherein the at least one volumetric video bitstream is culled after the at least one volumetric video bitstream has been encoded such that patches belonging to a certain view are grouped together in a single atlas.

3. The apparatus of claim 1,
wherein the atlas-to-view mapping metadata is received as a supplemental enhancement information message comprising a payload size and bitmask indicating mapping information between views and atlases;
wherein the atlas-to-view mapping metadata specifies a persistence of a previous atlas view supplemental enhancement information message;
wherein the persistence is specified using a flag;
wherein the flag being equal to zero specifies that the atlas view supplemental enhancement information message applies to a current atlas frame; and
wherein the flag being equal to one specifies that the atlas view supplemental enhancement information message applies to the current atlas frame and persists for subsequent atlas frames in decoding order until meeting at least one condition comprising a beginning of a new sequence, an ending of the at least one volumetric video bitstream, or an atlas frame having a supplemental enhancement information message present.

4. The apparatus of claim 1, wherein:
the at least one volumetric video bitstream comprises one or more coded visual volumetric video-based coding sequences;
the one or more coded visual volumetric video-based coding sequences comprise at least one video based point cloud coding parameter set; and
the one or more coded visual volumetric video-based coding sequences comprise at least one visual volumetric video-based coding sub-bitstream associated with a visual volumetric video-based coding component that starts with a corresponding intra random access picture sub-bitstream unit.

5. The apparatus of claim 1, wherein the at least one memory and the computer program code are further configured to, with the at least one processor, cause the apparatus at least to:
interpret a sample group entry that provides a mapping of the at least one atlas to the at least one object that configures a view-frustum culling.

6. The apparatus of claim 1, wherein the information signals partial access utilizing a visual volumetric video-based coding supplemental enhancement information message family.

7. The apparatus of claim 1, wherein at least one of:
the volumetric video bitstream is a set of visual volumetric video-based coding sub-bitstreams, which belong to the same atlas;
the atlas-to-view mapping metadata or the atlas-to-object mapping metadata is received together with a camera extrinsic in a view parameter extrinsic substructure of an adaptation parameter structure;
the one or more sets of components belonging to the same atlas share an atlas identifier; or
a component of the one or more sets of components is atlas data, or video coded occupancy, attribute or geometry data, and the one or more sets of components represent a partial portion of a scene.

8. The apparatus of claim 1, wherein the at least one memory and the computer program code are further configured to, with the at least one processor, cause the apparatus at least to:
cull an entire atlas using the atlas-to-view mapping metadata and the atlas-to-object mapping metadata;
wherein the at least one volumetric video bitstream is culled after the at least one volumetric video bitstream has been encoded such that patches belonging to a certain object are grouped together in a single atlas.

9. The apparatus of claim 1,
wherein the atlas-to-object mapping metadata is received as a supplemental enhancement information message, and indicates a value of the at least one object given an atlas identifier and an index of the at least one object;
wherein the atlas-to-object mapping metadata indicates, for the at least one object, an atlas that contains patches referring back to the at least one object;
wherein the atlas-to-object mapping metadata is received as a supplemental enhancement information message comprising a payload size and bitmask indicating mapping information between objects and atlases;
wherein the atlas-to-object mapping metadata specifies a persistence of a previous atlas object supplemental enhancement information message;
wherein the persistence is specified using a flag;
wherein the flag being equal to zero specifies that the atlas object supplemental enhancement information message applies to a current atlas frame; and
wherein the flag being equal to one specifies that the atlas object supplemental enhancement information message applies to the current atlas frame and persists for subsequence atlas frames in decoding order until meeting at least one condition comprising a beginning of a new sequence, an ending of the at least one volumetric video bitstream, or an atlas frame having a supplemental enhancement information message present.

10. An apparatus comprising:
at least one processor; and
at least one non-transitory memory including computer program code;
wherein the at least one memory and the computer program code are configured to, with the at least one processor, cause the apparatus at least to:

provide information related to a culling of one or more sets of components belonging to the same atlas from at least one volumetric video bitstream;

wherein the information comprises one or more of:
- atlas-to-view mapping metadata that indicates an association between patches in at least one atlas and at least one view;
- atlas-to-object mapping metadata that indicates an association between at least one object and the at least one atlas;
- patch atlas metadata within a metadata for immersive video master atlas to indicate sub-bitstream culling based on fine-grained patch visibility culling; or
- partial access metadata, wherein leveraging the partial access metadata comprises storing each of the at least one atlas in its own track, and providing sample grouping information to indicate culling on a file format level; and transmit the information to a receiving device.

11. The apparatus of claim 10,
wherein the information is provided using at least one sample group entry object; and
wherein the at least one memory and the computer program code are further configured to, with the at least one processor, cause the apparatus at least to:
encode the at least one volumetric video bitstream such that patches belonging to a certain object are grouped together in a single atlas.

12. The apparatus of claim 10,
wherein the atlas-to-view mapping metadata is provided as a supplemental enhancement information message comprising a payload size and bitmask indicating mapping information between views and atlases;
wherein the atlas-to-view mapping metadata specifies a persistence of a previous atlas view supplemental enhancement information message;
wherein the persistence is specified using a flag;
wherein the flag being equal to zero specifies that the atlas view supplemental enhancement information message applies to a current atlas frame; and
wherein the flag being equal to one specifies that the atlas view supplemental enhancement information message applies to the current atlas frame and persists for subsequent atlas frames in decoding order until meeting at least one condition comprising a beginning of a new sequence, an ending of the at least one volumetric video bitstream, or an atlas frame having a supplemental enhancement information message present.

13. The apparatus of claim 10, wherein:
the at least one volumetric video bitstream comprises one or more coded visual volumetric video-based coding sequences;
the one or more coded visual volumetric video-based coding sequences comprise at least one video based point cloud coding parameter set; and
the one or more coded visual volumetric video-based coding sequences comprise at least one visual volumetric video-based coding sub-bitstream associated with a visual volumetric video-based coding component that starts with a corresponding intra random access picture sub-bitstream unit.

14. The apparatus of claim 10, wherein the at least one memory and the computer program code are further configured to, with the at least one processor, cause the apparatus at least to:
define a sample group entry that provides a mapping of the at least one atlas to the at least one object that configures a view-frustum culling.

15. The apparatus of claim 10, wherein the information signals partial access utilizing a visual volumetric video-based coding supplemental enhancement information message family.

16. The apparatus of claim 10, wherein at least one of:
the volumetric video bitstream is a set of visual volumetric video-based coding sub-bitstreams, which belong to the same atlas;
the atlas-to-view mapping metadata or the atlas-to-object mapping metadata is provided together with a camera extrinsic in a view parameter extrinsic substructure of an adaptation parameter structure;
the one or more sets of components belonging to the same atlas share an atlas identifier; or
a component of the one or more sets of components is atlas data, or video coded occupancy, attribute or geometry data, and the one or more sets of components represent a partial portion of a scene.

17. The apparatus of claim 10, wherein the at least one memory and the computer program code are further configured to, with the at least one processor, cause the apparatus at least to:
encode the at least one volumetric video bitstream such that patches belonging to a certain view are grouped together in a single atlas;
wherein an entire atlas is culled using the atlas-to-view mapping metadata and the atlas-to-object mapping metadata.

18. The apparatus of claim 10,
wherein the atlas-to-object mapping metadata is provided as a supplemental enhancement information message, and indicates a value of the at least one object given an atlas identifier and an index of the at least one object;
wherein the atlas-to-object mapping metadata indicates, for the at least one object, an atlas that contains patches referring back to the at least one object;
wherein the atlas-to-object mapping metadata is provided as a supplemental enhancement information message comprising a payload size and bitmask indicating mapping information between objects and atlases;
wherein the atlas-to-object mapping metadata specifies a persistence of a previous atlas object supplemental enhancement information message;
wherein the persistence is specified using a flag;
wherein the flag being equal to zero specifies that the atlas object supplemental enhancement information message applies to a current atlas frame; and
wherein the flag being equal to one specifies that the atlas object supplemental enhancement information message applies to the current atlas frame and persists for subsequence atlas frames in decoding order until meeting at least one condition comprising a beginning of a new sequence, an ending of the at least one volumetric video bitstream, or an atlas frame having a supplemental enhancement information message present.

19. A method comprising:
receiving information to cull one or more sets of components belonging to the same atlas from at least one volumetric video bitstream;
wherein the information comprises one or more of:
atlas-to-view mapping metadata that indicates an association between patches in at least one atlas and at least one view;

atlas-to-object mapping metadata that indicates an association between at least one object and the at least one atlas;

patch atlas metadata within a metadata for immersive video master atlas to indicate sub-bitstream culling based on fine-grained patch visibility culling; or partial access metadata, wherein leveraging the partial access metadata comprises storing each of the at least one atlas in its own track, and providing sample grouping information to indicate culling on a file format level; and culling the one or more sets of components belonging to the same atlas from the at least one volumetric video bitstream, based on the information.

20. The method of claim 19, further comprising:
rendering a view frustum corresponding to one or more sets of components of the volumetric video bitstream that have not been culled.

* * * * *